(12) United States Patent
Hart, Jr. et al.

(10) Patent No.: US 8,131,609 B1
(45) Date of Patent: Mar. 6, 2012

(54) SYSTEM AND METHOD FOR MANAGING UTILITY RESOURCES BASED ON UTILITY SERVICE POINTS

(75) Inventors: Robert L. Hart, Jr., Olympia, WA (US); Michael S. Robbins, Dallas, TX (US)

(73) Assignee: MRDB Holdings, L.P., Dallas, TX (US)

( * ) Notice: Subject to any disclaimer, the term of this patent is extended or adjusted under 35 U.S.C. 154(b) by 160 days.

(21) Appl. No.: 12/171,834

(22) Filed: Jul. 11, 2008

Related U.S. Application Data

(60) Provisional application No. 60/959,318, filed on Jul. 12, 2007.

(51) Int. Cl.
| | | |
|---|---|---|
| *G07B 17/00* | (2006.01) | |
| *G07B 17/02* | (2006.01) | |
| *G07F 19/00* | (2006.01) | |
| *G01R 11/56* | (2006.01) | |
| *G01R 21/133* | (2006.01) | |
| *G06F 17/00* | (2006.01) | |
| *G06F 17/50* | (2006.01) | |
| *A01K 5/02* | (2006.01) | |

(52) U.S. Cl. ............. 705/30; 705/412; 705/404; 705/29
(58) Field of Classification Search ............. 705/30, 705/29, 404, 412
See application file for complete search history.

(56) References Cited

U.S. PATENT DOCUMENTS

| | | | | |
|---|---|---|---|---|
| 4,351,028 A | * | 9/1982 | Peddie et al. ............. 700/286 |
| 4,881,070 A | * | 11/1989 | Burrowes et al. ........ 340/870.02 |
| 5,283,572 A | * | 2/1994 | McClelland et al. .... 340/870.02 |
| 5,422,565 A | * | 6/1995 | Swanson .................. 324/110 |
| 5,572,438 A | * | 11/1996 | Ehlers et al. ............. 700/295 |
| 5,649,115 A | * | 7/1997 | Schrader et al. ............. 705/33 |
| 5,758,331 A | * | 5/1998 | Johnson .................. 705/412 |
| 5,854,995 A | * | 12/1998 | Plis et al. .................. 702/72 |
| 6,035,285 A | * | 3/2000 | Schlect et al. ............. 705/30 |
| 6,360,211 B1 | * | 3/2002 | Anderson et al. ........... 705/40 |
| 6,636,893 B1 | * | 10/2003 | Fong ........................ 709/223 |
| 6,868,293 B1 | * | 3/2005 | Schurr et al. ............. 700/22 |
| 6,904,336 B2 | * | 6/2005 | Raines et al. ............. 700/286 |
| 6,982,651 B2 | * | 1/2006 | Fischer ................. 340/870.02 |
| 7,385,524 B1 | * | 6/2008 | Orlosky ................. 340/870.28 |

(Continued)

OTHER PUBLICATIONS

Save More Resources, Inc publication. PN PB0030904.a Published in 2004. Admitted prior art in IDS.*

(Continued)

*Primary Examiner* — Matthew Gart
*Assistant Examiner* — Harshad Parikh
(74) *Attorney, Agent, or Firm* — Baker Botts L.L.P.

(57) ABSTRACT

A system comprises a memory that stores a plurality of usage values. A usage value may be based at least in part on usage of a utility resource measured by a utility meter having a meter identifier. The memory may store a plurality of service point identifiers and a plurality of account identifiers associated with one or more utility accounts. A particular service point identifier may represent a physical location of at least one utility meter. Each service point identifier may be stored in association with one or more usage values. The system may comprise a processor communicatively coupled to the memory. In response to a request comprising a particular service point identifier, the processor may retrieve one or more usage values from the memory based at least in part on the particular service point identifier in the request. The processor may generate a graphical user interface that displays the one or more retrieved usage values.

20 Claims, 18 Drawing Sheets

U.S. PATENT DOCUMENTS

| | | | |
|---|---|---|---|
| 2001/0032155 A1* | 10/2001 | Groat et al. | 705/35 |
| 2002/0147668 A1* | 10/2002 | Smith et al. | 705/30 |
| 2003/0172013 A1* | 9/2003 | Block et al. | 705/33 |
| 2004/0117330 A1* | 6/2004 | Ehlers et al. | 705/412 |
| 2005/0240427 A1* | 10/2005 | Crichlow | 705/1 |
| 2006/0069661 A1* | 3/2006 | Scoggins et al. | 705/412 |
| 2006/0230002 A1* | 10/2006 | Bennett et al. | 705/412 |
| 2007/0203814 A1* | 8/2007 | Di Florio et al. | 705/30 |
| 2007/0239477 A1* | 10/2007 | Budike, Jr. | 705/1 |
| 2008/0040295 A1* | 2/2008 | Kaplan et al. | 705/412 |
| 2008/0275802 A1* | 11/2008 | Verfuerth et al. | 705/35 |
| 2009/0048901 A1* | 2/2009 | Richard et al. | 705/10 |
| 2009/0048950 A1* | 2/2009 | Howell et al. | 705/30 |
| 2009/0083090 A1* | 3/2009 | Rolfes et al. | 705/7 |
| 2009/0157534 A1* | 6/2009 | Arsiwala | 705/30 |
| 2009/0234757 A1* | 9/2009 | Tarbell et al. | 705/30 |
| 2009/0312969 A1* | 12/2009 | Sundaresh et al. | 702/62 |
| 2009/0319315 A1* | 12/2009 | Branscomb | 705/7 |
| 2009/0327108 A1* | 12/2009 | Swierz et al. | 705/31 |
| 2010/0106626 A1* | 4/2010 | Ashrafzadeh et al. | 705/29 |
| 2010/0174643 A1* | 7/2010 | Schaefer et al. | 705/40 |
| 2011/0166913 A1* | 7/2011 | Buchanan | 705/7.39 |

OTHER PUBLICATIONS

Advance Metering: Joe Hughes, Energy Makets, Houston: Oct. / Nov. 2005 vol. 10 Iss 8: p. 43 (1 pgs).*

Lightning your load, Printing World, p. 25, Sep. 13, 1999 Published by Miller Freeman UK Ltd.*

Power Measurement introduces IONEEM, PR Newswire, New York, Jun. 23, 2004 p. 1.*

Third Party billing: Having it customer's wayColeman Gina, Electric Perspectives, V28 No. 5, pp. 75-80 Sep. / Oct. 2003.*

Work smarter with submeters, Don Millstein, Buildings, Cedar Rapids, May 2003, vol. 97, Iss 5 p. 22.*

*Reduce Your Utility Costs and Consumption with SMR Software Solutions*, SMR Save More Resources Inc.; The Utility Manager™ Online; 2 pages, 2004.

Pending U.S. Appl. No. 12/171,789 entitled *System and Method for Managing Utility Resources Based on Supply and Audit Data* by Robert L. Hart Jr., et al.; 73 total pages, filed Jul. 11, 2008.

Pending U.S. Appl. No. 12/171,885 entitled *System and Method for Managing Utility Resources Based on Normalized Utility Usage* by Michael S. Robbins, et al.; 73 total pages, filed Jul. 11, 2008.

* cited by examiner

FIG. 3

| SERVICE POINT | ADDRESS | ACCOUNT | VENDOR | DATES | METER | UTILITY USAGE (MWh) | | | UTILITY COST ($) | | |
|---|---|---|---|---|---|---|---|---|---|---|---|
| | | | | | | NOV. '02 | ... | NOV. '07 | NOV. '02 | ... | NOV. '07 |
| A | 123 MAIN | L | Q | 11/3/03 - PRESENT | T | ... | ... | 1,012 | ... | ... | 103,204 |
| | | M | R | 11/3/02 - 11/2/03 | U | 1,036 | ... | | 105,002 | ... | |
| B | 123 MAIN | L | Q | 11/3/03 - PRESENT | V | ... | ... | 1,845 | ... | ... | 190,321 |
| | | M | R | 11/3/02 - 11/2/03 | W | 1,968 | ... | | 197,681 | ... | |
| C | 789 BROADWAY | P | S | 6/2/03 - PRESENT | Y | ... | ... | 902 | ... | ... | 101,645 |
| | | | | 6/2/01 - 6/1/03 | Z | 1,008 | ... | | 101,724 | ... | |

Utility Manager

DATA CENTRAL | SUPPLY MANAGEMENT | ENERGY EFFICIENCY | BILL AUDIT | BILL DATA | BUDGET / FORECAST | WEATHER | EMISSIONS

Scope: ○ Year ○ Year-to-Date ● Month    Date Ending: 06/2008 ▾    ● Grid   ○ kWh/Sqft   ○ $/Sqft

| Site Name | Sqft | kWh | kWh/Sqft | Vs.Avg | Total Cost | $/Sqft | Vs.Avg |
|---|---|---|---|---|---|---|---|
| Smith – City Square | 459,206 | 791,880 | 1.7 | -15.9% | $90,778.79 | $.20 | -15.9% |
| Smith – Eastside Towers | 354,267 | 746,195 | 2.1 | +2.8% | $85,541.60 | $.24 | +2.8% |
| Smith – Fortune Office Suites | 221,000 | 496,994 | 2.2 | +9.7% | $56,973.89 | $.26 | +9.7% |
| Smith – Huffington Center | 359,630 | 594,163 | 1.7 | -19.4% | $68,113.06 | $.19 | -19.4% |
| Smith – Northrop Plaza | 205,200 | 423,107 | 2.1 | +.6% | $48,503.74 | $.24 | +.6% |
| Smith – Oak Park Complex | 68,500 | 142,657 | 2.1 | +1.6% | $16,353.74 | $.24 | +1.6% |
| Smith – Renaissance Hall | 295,543 | 871,416 | 2.9 | +43.9% | $99,896.56 | $.34 | +43.9% |
| Smith – Riverside Center | 306,052 | 666,917 | 2.2 | +6.3% | $76,453.36 | $.25 | +6.3% |
| Smith – Shady Creek Suites | 503,074 | 913,903 | 1.8 | -11.4% | $104,767.08 | $.21 | -11.4% |
| Smith – Weston Center | 236,535 | 396,255 | 1.7 | -18.3% | $45,425.49 | $.19 | -18.3% |
| Totals | 3,009,007 | 6,043,488 | 2.0 | -2.0% | $692,807.30 | $.23 | -2.0% |
| Averages | 300,901 | 604,349 | 2.0 | | $69,280.73 | $.23 | |

Export to Excel    Export to PDF

| | | | | | Utility Manager | | Smith | | | | | | Contact Us  Logout (Current user: SMITH) | |
|---|---|---|---|---|---|---|---|---|---|---|---|---|---|---|
| DATA CENTRAL | SUPPLY MANAGEMENT | | ENERGY EFFICIENCY | | BILL AUDIT | BILL DATA | | BUDGET / FORECAST | | | WEATHER | | EMISSIONS | |
| Site: | Eastside Towers ▼ | | | Account: | 10443720001383625 ▼ | | | Invoices found: 83 | | | | | 386 | |
| Image | Bill Date | Days | Usage (kWh) | kWh/ Day | Billed Demand (kW) | Actual Demand (kW) | Energy Charges | $/Day | $/kWh | Taxes | TDSP Charges | TDSP $/kWh | Total Cost |
| | 12/20/08 | 29 | 338,591 | 11,676 | 1,095 | 1,083 | $30,066.88 | $1,036.79 | $.0888 | $2,961.66 | $5,786.52 | $.0171 | $38,815.06 |
| | 11/21/08 | 29 | 321,957 | 11,102 | 922 | 917 | $28,589.78 | $985.85 | $.0888 | $2,816.16 | $5,502.25 | $.0171 | $36,908.19 |
| | 10/23/08 | 29 | 316,276 | 10,906 | 844 | 839 | $28,085.31 | $968.46 | $.0888 | $2,766.47 | $5,405.16 | $.0171 | $36,256.94 |
| | 09/24/08 | 32 | 347,008 | 10,844 | 855 | 851 | $30,814.31 | $962.95 | $.0888 | $3,035.28 | $5,930.37 | $.0171 | $39,779.96 |
| | 08/23/08 | 30 | 358,729 | 11,958 | 906 | 870 | $31,855.14 | $1,061.84 | $.0888 | $3,137.80 | $6,130.68 | $.0171 | $41,123.62 |
| | 07/24/08 | 32 | 370,450 | 11,577 | 958 | 890 | $32,895.96 | $1,028.00 | $.0888 | $3,240.33 | $6,330.99 | $.0171 | $42,467.28 |
| | 06/22/08 | 30 | 323,876 | 10,796 | 958 | 890 | $28,760.19 | $958.67 | $.0888 | $2,832.94 | $5,535.04 | $.0171 | $37,128.17 |
| | 05/23/08 | 33 | 309,727 | 9,386 | 950 | 881 | $27,503.76 | $833.45 | $.0888 | $2,709.18 | $5,293.23 | $.0171 | $35,506.17 |
| | 04/20/08 | 30 | 356,412 | 11,880 | N/A | 1,099 | $24,010.59 | $800.35 | $.0674 | N/A | N/A | $.0069 | $26,455.59 |
| | 03/21/08 | 29 | 318,476 | 10,982 | N/A | 895 | $21,147.06 | $729.21 | $.0664 | $2,766.61 | $5,516.75 | $.0173 | $29,430.42 |
| | 02/20/08 | 29 | 392,515 | 13,535 | N/A | 1,074 | $27,316.86 | $941.96 | $.0696 | $3,477.29 | $6,160.54 | $.0157 | $36,954.69 |
| | 01/22/08 | 33 | 444,581 | 13,472 | N/A | 1,129 | $28,763.90 | $871.63 | $.0647 | $2,842.92 | $6,543.92 | $.0147 | $38,150.74 |
| | 12/20/07 | 29 | 338,591 | 11,676 | 1,095 | 1,083 | $30,066.88 | $1,036.79 | $.0888 | $2,961.66 | $5,786.52 | $.0171 | $38,815.06 |
| | 11/28/07 | 29 | 321,957 | 11,102 | 922 | 917 | $28,589.78 | $985.85 | $.0888 | $2,816.16 | $5,502.25 | $.0171 | $36,908.19 |
| | 10/27/07 | 29 | 316,276 | 10,906 | 844 | 839 | $28,085.31 | $968.46 | $.0888 | $2,766.47 | $5,405.16 | $.0171 | $36,256.94 |
| | 09/28/07 | 32 | 347,008 | 10,844 | 855 | 851 | $30,814.31 | $962.95 | $.0888 | $3,035.28 | $5,930.37 | $.0171 | $39,779.96 |
| | 08/27/07 | 30 | 358,729 | 11,958 | 906 | 870 | $31,855.14 | $1,061.84 | $.0888 | $3,137.80 | $6,130.68 | $.0171 | $41,123.62 |
| | 07/27/07 | 32 | 370,450 | 11,577 | 958 | 890 | $32,895.96 | $1,028.00 | $.0888 | $3,240.33 | $6,330.99 | $.0171 | $42,467.28 |
| | 06/28/07 | 30 | 323,876 | 10,796 | 958 | 890 | $28,760.19 | $958.67 | $.0888 | $2,832.94 | $5,535.04 | $.0171 | $37,128.17 |
| | 06/02/07 | 33 | 309,727 | 9,386 | 950 | 881 | $27,503.76 | $833.45 | $.0888 | $2,709.18 | $5,293.23 | $.0171 | $35,506.17 |
| | 04/20/07 | 30 | 356,412 | 11,880 | 1,100 | 1,099 | $24,010.59 | $800.35 | $.0674 | N/A | $8,846.36 | $.0248 | $32,856.95 |
| | 03/21/07 | 28 | 318,476 | 11,374 | 904 | 895 | $21,147.06 | $755.25 | $.0664 | $2,766.61 | $5,516.75 | $.0173 | $29,430.42 |
| | 02/20/07 | 29 | 392,515 | 13,535 | 1,074 | 1,074 | $27,316.86 | $941.96 | $.0696 | $3,477.29 | $6,160.54 | $.0157 | $36,954.69 |

*'N/A' indicates data not available from supplier*

Export to Excel   Export to PDF

| Period | Energy Budget | TDSP Budget | Tax Budget | Total Budget | Total Actual | % Variance |
|---|---|---|---|---|---|---|
| 01/2008 | $43,015 | $9,704 | $5,272 | $57,992 | $53,993 | -6.9 |
| 02/2008 | $40,707 | $8,805 | $4,951 | $54,463 | $48,965 | -10.1 |
| 03/2008 | $37,985 | $8,511 | $4,650 | $51,145 | $40,179 | -21.4 |
| 04/2008 | $35,141 | $8,923 | $4,406 | $48,469 | $37,924 | -21.8 |
| 05/2008 | $37,457 | $9,372 | $4,683 | $51,513 | $46,084 | -10.5 |
| 06/2008 | $39,549 | $8,709 | $4,826 | $53,085 | $48,504 | -8.6 |
| 07/2008 | $47,186 | $9,325 | $5,651 | $62,162 | $57,869 | -6.9 |
| 08/2008 | $51,521 | $9,431 | $6,095 | $67,047 | $67,047 | 0.0 |
| 09/2008 | $37,214 | $8,218 | $4,543 | $49,975 | $49,975 | 0.0 |
| 10/2008 | $36,279 | $8,752 | $4,503 | $49,534 | $49,534 | 0.0 |
| 11/2008 | $37,970 | $7,962 | $4,593 | $50,525 | $50,525 | 0.0 |
| 12/2008 | $47,489 | $9,734 | $5,722 | $62,945 | $62,945 | 0.0 |
| Year ending 12/2008 | $491,512 | $107,447 | $59,896 | $658,856 | $613,545 | -6.9 |

| State | Electricity (lbs/MWh) | Natural Gas (lbs/kBtu) | Oil (lbs/kBtu) | Diesel (lbs/kBtu) | Coal (lbs/kBtu) | Wood (lbs/kBtu) | Propane (lbs/kBtu) | Steam (lbs/kBtu) | Chilled Water (lbs/kBtu) |
|---|---|---|---|---|---|---|---|---|---|
| AK | 1106.4840 | 0.1164 | 0.1597 | 0.1597 | 0.2262 | 0.2049 | 0.1383 | 0.1741 | 0.1538 |
| AL | 1298.6520 | 0.1164 | 0.1597 | 0.1597 | 0.2262 | 0.2049 | 0.1383 | 0.1741 | 0.1538 |
| AR | 1280.2540 | 0.1164 | 0.1597 | 0.1597 | 0.2262 | 0.2049 | 0.1383 | 0.1741 | 0.1538 |
| AZ | 1218.8640 | 0.1164 | 0.1597 | 0.1597 | 0.2262 | 0.2049 | 0.1383 | 0.1741 | 0.1538 |
| CA | 700.4000 | 0.1164 | 0.1597 | 0.1597 | 0.2262 | 0.2049 | 0.1383 | 0.1741 | 0.1538 |
| CO | 1986.0850 | 0.1164 | 0.1597 | 0.1597 | 0.2262 | 0.2049 | 0.1383 | 0.1741 | 0.1538 |
| CT | 754.1860 | 0.1164 | 0.1597 | 0.1597 | 0.2262 | 0.2049 | 0.1383 | 0.1741 | 0.1538 |
| DC | 3614.2510 | 0.1164 | 0.1597 | 0.1597 | 0.2262 | 0.2049 | 0.1383 | 0.1741 | 0.1538 |
| DE | 1803.7320 | 0.1164 | 0.1597 | 0.1597 | 0.2262 | 0.2049 | 0.1383 | 0.1741 | 0.1538 |
| FL | 1348.0310 | 0.1164 | 0.1597 | 0.1597 | 0.2262 | 0.2049 | 0.1383 | 0.1741 | 0.1538 |
| GA | 1388.3310 | 0.1164 | 0.1597 | 0.1597 | 0.2262 | 0.2049 | 0.1383 | 0.1741 | 0.1538 |
| HI | 1654.7360 | 0.1164 | 0.1597 | 0.1597 | 0.2262 | 0.2049 | 0.1383 | 0.1741 | 0.1538 |
| IA | 1943.2840 | 0.1164 | 0.1597 | 0.1597 | 0.2262 | 0.2049 | 0.1383 | 0.1741 | 0.1538 |
| ID | 143.9450 | 0.1164 | 0.1597 | 0.1597 | 0.2262 | 0.2049 | 0.1383 | 0.1741 | 0.1538 |
| IL | 1154.7540 | 0.1164 | 0.1597 | 0.1597 | 0.2262 | 0.2049 | 0.1383 | 0.1741 | 0.1538 |
| IN | 2098.0280 | 0.1164 | 0.1597 | 0.1597 | 0.2262 | 0.2049 | 0.1383 | 0.1741 | 0.1538 |

*FIG. 14*

SYSTEM AND METHOD FOR MANAGING UTILITY RESOURCES BASED ON UTILITY SERVICE POINTS

RELATED APPLICATION

This patent application claims priority to Patent Application Ser. No. 60/959,318, filed Jul. 12, 2007, entitled Energy Management System User Interface.

TECHNICAL FIELD

The present disclosure relates generally to utility management and more specifically to a system and method for managing utility resources based on utility service points.

BACKGROUND

Traditional systems for managing utility resources allow users to store invoices received from vendors. In addition, these systems may permit users to search for invoices associated with a particular date or a particular account. These traditional systems, however, do not store audit information, supply information, and efficiency information for customer sites. In addition, these systems do not formulate strategies for reducing utility costs of a customer based on audit information, supply information, and efficiency information. As a result, these systems have proven unsatisfactory for assisting customers in managing utility costs.

SUMMARY

In accordance with the present disclosure, the disadvantages and problems associated with prior utility management systems have been substantially reduced or eliminated.

In some embodiments, a system comprises a memory that stores a plurality of utility invoices associated with one or more customers. A particular utility invoice comprises a bill for a utility resource provided by a utility vendor to a particular customer. The memory further stores supply data associated with the plurality of customers, the supply data comprising a plurality of contract terms from at least one contract between the utility vendor and the particular customer. The memory further stores site data associated with the plurality of customers, the site data comprising one or more characteristics of a site of the particular customer. The system further comprises a processor that determines at least one strategy to reduce utility costs of the particular customer, the determination based at least in part on the particular utility invoice, the supply data, and the site data. The processor may generate a graphical user interface that displays the at least one determined strategy.

In some embodiments, a system comprises a memory that stores a plurality of usage values. A usage value may be based at least in part on usage of a utility resource measured by a utility meter having a meter identifier. The memory may store a plurality of service point identifiers and a plurality of account identifiers associated with one or more utility accounts. A particular service point identifier may represent a physical location of at least one utility meter. Each service point identifier may be stored in association with one or more usage values. The system may comprise a processor communicatively coupled to the memory. In response to a request comprising a particular service point identifier, the processor may retrieve one or more usage values from the memory based at least in part on the particular service point identifier in the request. The processor may generate a graphical user interface that displays the one or more retrieved usage values.

In some embodiments, a system comprises a memory that stores weather data associated with a site. The system further comprises a processor that determines a balance point of the site based at least in part on the weather data. The processor may determine an amount of utility usage at the site during a particular time period. The processor may normalize the amount of utility usage based at least in part on the balance point and the weather data. The processor may generate a graphical user interface that displays the balance point and the normalized amount of utility usage.

Various embodiments described herein may have none, some, or all of the following advantages. One advantage is that the system may comprise a utility management platform that monitors and evaluates information regarding invoices, supply contracts, efficiency, and/or audits associated with customer sites. Based at least in part on this information, the platform may determine strategies for reducing the utility costs of a customer. In some embodiments, these strategies comprise fixing equipment (e.g., a malfunctioning meter) and/or correcting billing errors (e.g., a meter reading error or a miscalculation of a utility rate). According to certain embodiments, these strategies may comprise negotiating particular contract terms, changing the operating parameters at a customer site, and/or applying for particular credits and/or refunds from a vendor. The platform may guide a customer in implementing these strategies to reduce utility costs and/or to increase the efficiency of a customer site.

Another advantage is that the system may comprise invoice databases that are indexed according to service point identifiers. Indexing a database according to service point identifier may provide long-term advantages over indexing the database only according to account number and/or meter identifier. For example, a customer occasionally changes an account and/or replaces a meter associated with a customer site. The new account may be assigned a new account number and the new meter may be assigned a new meter identifier. However, obtaining a new account or a new meter does not change the service point identifier for a related service point. If the database is not indexed according to service point identifier, then a query based on the new account number and/or the new meter number may not retrieve historical invoice data that is associated with prior accounts and/or meters. Accordingly, by indexing the database according to service point identifier, the system may more accurately and/or efficiently respond to queries for historical invoice data.

Another advantage is that the system may normalize utility usage with respect to weather at a customer site. In some embodiments, the system may provide a graphical user interface that graphically illustrates normalized usage data for a customer site for a particular period of time. The graphical presentation of normalized usage data may permit a user to easily identify problems unrelated to weather that may contribute to changes in utility usage at the customer site.

Another advantage is that the system may determine the emissions of pollutants caused, directly or indirectly, by utility usage at a customer site. According to certain embodiments, the system may generate a graphical user interface that illustrates emissions caused by an increase or decrease in normalized utility usage at the customer site. The user interface may illustrate how the activities of the customer, rather than the weather, are affecting the level of emissions caused by the customer site.

Other advantages will be readily apparent to one skilled in the art from the description and the appended claims.

BRIEF DESCRIPTION OF THE DRAWINGS

For a more complete understanding of the present disclosure and its advantages, reference is now made to the following description taken in conjunction with the accompanying drawings, in which:

FIG. 3 illustrates example invoice data stored in a utility management platform, according to certain embodiments;

FIG. 5 illustrates an example GUI that comprises information regarding supply contracts, according to certain embodiments;

FIG. 7 illustrates an example GUI that displays information regarding the efficiency of customer sites, according to certain embodiments;

FIG. 9 illustrates an example GUI that displays detailed invoice data, according to certain embodiments;

FIG. 10 illustrates an example GUI that displays information regarding a budget for a utility resource, according to certain embodiments;

FIGS. 14-16 illustrate example GUIs that display emission data associated with customer sites, according to certain embodiments;

DETAILED DESCRIPTION

Figure 1:
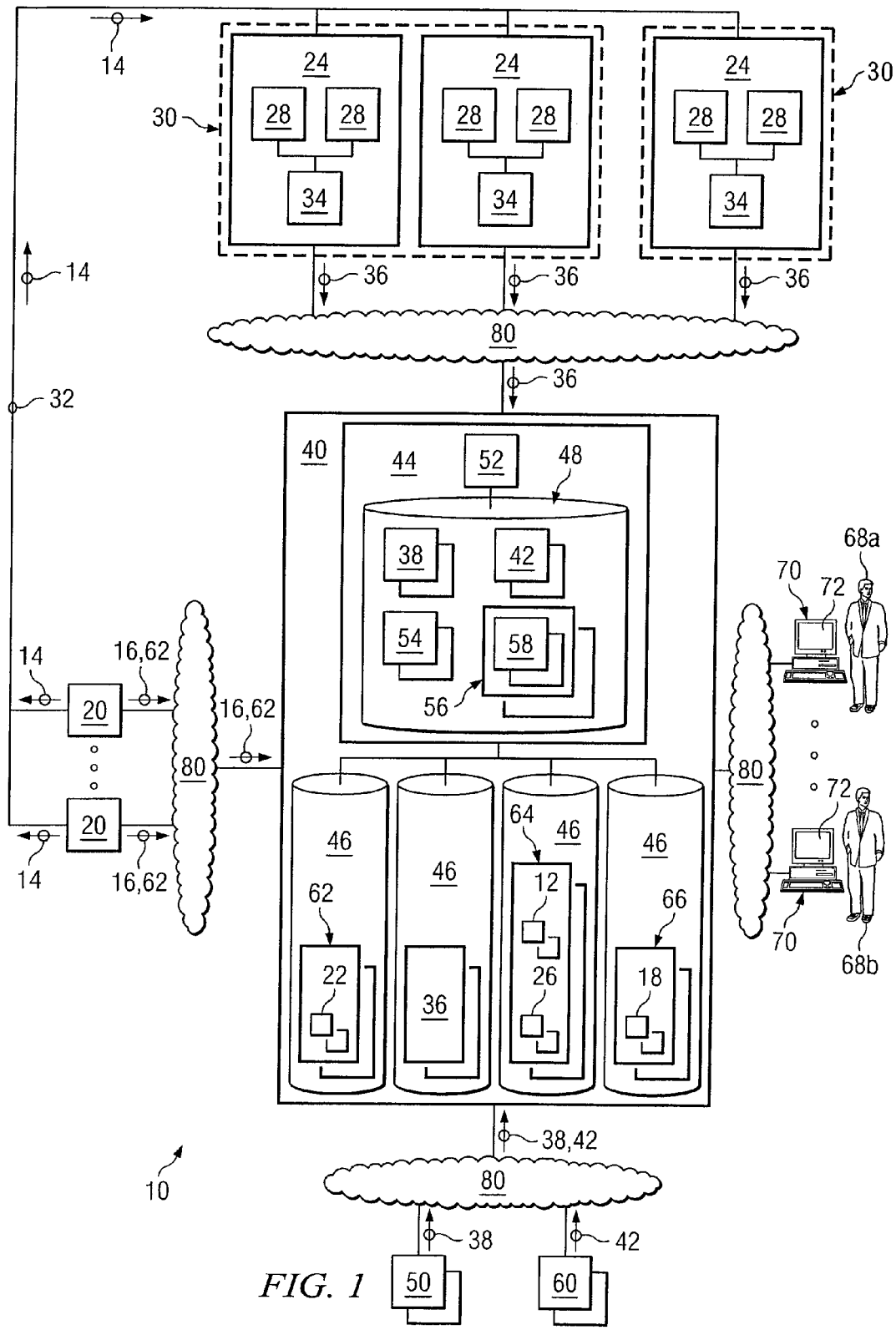
FIG. 1 illustrates a utility management system, according to certain embodiments.

FIG. 1 illustrates a utility management system 10, according to certain embodiments. System 10 may comprise one or more vendors 20, customers 30, utility management platforms 40, market centers 50, weather centers 60, and clients 70 communicatively coupled by one or more networks 80. System 10 generally assists customers 30 in managing utility costs 12 charged by vendors 20. In some embodiments, vendors 20 provide customers 30 with utility resources 14 such as, for example, electricity, gas, oil, and water. Customers 30 may seek to manage procurement and usage of utility resources 14 to reduce utility costs 12. Prior systems permitted customers 30 to review invoices 16 from vendors 20. These prior systems, however, may not determine and advise customers 30 regarding strategies 18 for reducing utility costs 12. In contrast, utility management system 10 may collect and evaluate information regarding invoices 16, supply contracts 22, efficiency, and/or audits associated with customer 30. Based at least in part on this information, system 10 may determine and provide to customer 30 strategies 18 for reducing utility costs 12 and/or increasing efficiency of customer sites 24.

System 10 may comprise one or more vendors 20. Vendor 20 may comprise any suitable business entity that provides utility resources 14 to customers 30. In some embodiments, vendor 20 comprises a company that generates, produces, refines, distributes, and/or sells utility resources 14. Vendor 20 may be a regulated, unregulated, retail, and/or wholesale provider of utility resource 14. In some embodiments, vendor 20 is an energy company such as, for example, an electricity company, a gas company, an oil company, and/or a coal company. In other embodiments, company is a telecommunications company such as, for example, a telephone company, a cellular service provider, a satellite service provider, and/or an Internet service provider. In yet other embodiments, company provides public services such as, for example, water, steam, sewer, and/or garbage services. System 10 may comprise any number and/or combination of vendors 20.

Vendors 20 may transmit invoices 16 to platform 40 and/or customers 30 to collect payment for utility resources 14. Invoice 16 may represent a bill for utility resources 14 provided to customer 30 during a given billing period. Invoice 16 may comprise any suitable billing information such as, for example, utility usage 26 and utility cost 12. Utility usage 26 may represent an amount of utility resource 14 used by at least a portion of customer site 24 during one or more billing periods. Utility cost 12 may represent a monetary amount that vendor 20 charges to customer 30 for utility resource 14 used by at least a portion of customer site 24 during one or more billing periods. Utility cost 12 may include or exclude taxes and/or fees associated with utility resource 14. Such fees may include a delivery fee, a customer fee, a supply fee, and/or any suitable type and/or combination of charges. Vendor 20 may transmit invoice 16 to platform 40 and/or customer 30 in any suitable format such as, for example, as an e-mail, electronic spreadsheet, digital image, and/or paper bill.

System 10 may comprise a plurality of customers 30. Customer 30 may represent any suitable entity that purchases and/or uses utility resource 14 from vendor 20. Customer 30 may be a business, organization, association, private individual, group of individuals, and/or any suitable entity. Each customer 30 in system 10 may be associated with one or more customer sites 24. In some embodiments, customer 30 may be associated with multiple sites 24 such as, for example, a supermarket company that operates multiple stores. In other embodiments, customer 30 may be associated with a single site 24 such as, for example, a bread company that operates a single bakery.

Site 24 may refer to any suitable facility, structure, property, and/or enterprise that uses at least one utility resource 14 from vendor 20. Using utility resource 14 may comprise consuming, converting, dissipating, and/or otherwise expending utility resource 14. Site 24 may comprise one or more customer systems 28 that use utility resource 14. For example, site 24 may comprise one or more mechanical systems, electrical systems, computer systems, manufacturing systems, heating systems, and/or air conditioning systems that use at least one utility resource 14 from vendor 20. Each site 24 may receive utility resources 14 from one or more vendors 20 via utility lines 32. Site 24 may be used for any suitable endeavor. In some embodiments, site 24 is a business site 24 such as, for example, a store, hospital, clinic, office, factory, warehouse, and/or hotel. In other embodiments, site 24 is a municipal site 24 such as, for example, a school, post office, and/or library. In yet other embodiments, site 24 is an agricultural or industrial site 24 such as, for example, a farm, ranch, lumber mill, refinery, and/or mine. System 10 may comprise any number and combination of sites 24.

In some embodiments, each site 24 comprises at least one site server 34. Site server 34 may monitor customer systems 28 and generate site data 36. Site data 36 may comprise information regarding the operation, performance, and/or maintenance of customer systems 28 at site 24. Site data 36 may comprise information regarding the equipment in customer system 28, the operating schedule of customer system 28, the quantity of utility resource 14 consumed by customer system 28, and/or the operating conditions associated with customer system 28. For example, site 24 may comprise an air conditioning system having multiple chillers. Site server 34 at site 24 may monitor the operation of the chillers and generate site data 36 that indicates the operating schedule of the chillers, the average load of the chillers, and/or the quantity of electricity consumed by the chillers. Site server 34 may transmit site data 36 to platform 40.

Site server 34 may comprise any suitable combination of hardware and/or software implemented in one or more modules to provide the described functions and operations. In some embodiments, site server 34 may comprise a general-purpose personal computer (PC), a Macintosh, a workstation, a Unix-based computer, a server computer, or any suitable processing device. In some embodiments, the functions and operations described above may be performed by a pool of multiple site servers 34.

Vendors 20 and/or customers 30 may be communicatively coupled to platform 40 via network 80. Platform 40 may manage utility costs 12 of customers 30 based at least in part on invoices 16, supply contracts 22, site data 36, market data 38, and/or weather data 42. In some embodiments, managing utility costs 12 comprises monitoring, renewing, and/or negotiating supply contracts 22 between customers 30 and vendors 20. Additionally or alternatively, managing utility costs 12 may comprise auditing invoices 16, supply contracts 22, and/or site data 36 to determine strategies 18 for reducing utility costs 12 of customers 30. In some embodiments, managing utility costs 12 may comprise processing invoices 16 to identify billing errors and/or potential credits from vendor 20. Platform 40 may comprise a management center and/or office for any person, business, or entity that manages utility costs 12 on behalf of customers 30. In some embodiments, platform 40 is owned and/or operated by a consulting company that manages utility costs 12 in exchange for fees or other consideration from customers 30.

Platform 40 may comprise a manager server 44 and one or more memory modules 46. Manager server 44 may receive invoices 16 from vendors 20 and site data 36 from sites 24. For a particular site 24, manager server 44 may compare invoices 16 with site data 36 to determine efficiency of customer systems 28 at site 24. Manager server 44 may compare invoices 16 with supply contract 22 of a particular customer 30 to determine billing errors and/or potential credits from vendor 20. In some embodiments, manager server 44 may process market data 38 to determine rates and/or contract terms to include in an existing or future supply contract 22 between customer 30 and vendor 20. According to certain embodiments, manager server 44 may normalize utility usage 26 at site 24 with respect to weather. In some embodiments, manager server 44 may determine increases and/or decreases in the emission of pollutants based at least in part on the normalized utility usage 26.

Manager server 44 may comprise any suitable combination of hardware and/or software implemented in one or more modules to provide the described functions and/or operations. In some embodiments, manager server 44 may comprise a general-purpose personal computer (PC), a Macintosh, a workstation, a Unix-based computer, a server computer, and/or any suitable processing device. According to certain embodiments, the functions and operations described above may be performed by a pool of multiple manager servers 44. Manager server 44 may comprise a manager memory 48 and a manager processor 52.

Manager memory 48 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as weather data 42. Although FIG. 1 illustrates manager memory 48 as internal to manager server 44, it should be understood that manager memory 48 may be internal or external to manager server 44, depending on particular implementations. Also, manager memory 48 may be separate from or integral to other memory devices to achieve any suitable arrangement of memory devices for use in system 10.

Manager memory 48 may store manager logic 54, emission data 56, market data 38, and weather data 42. Manager logic 54 may comprise rules, algorithms, code, tables, and/or other suitable instructions for performing the described functions and/or operations. Emission data 56 may comprise emission factors 58, emission rates, and/or other suitable information regarding pollutants associated with the production and/or consumption of utility resources 14. The use of emission data 56 to manage utility resources 14 is described in further detail with respect to FIGS. 14-19.

Manager memory 48 may be communicatively coupled to manager processor 52. Manager processor 52 is generally operable to execute manager logic 54 stored in manager memory 48 to manage utility resources 14 of customers 30. Manager processor 52 may comprise any suitable combination of hardware and/or software implemented in one or more modules to provide the described functions and/or operations.

Platform 40 may comprise one or more memory modules 46. Memory modules 46 may store any suitable data associated with system 10. Memory module 46 may represent any memory device, direct access storage device (DASD), and/or database module and may take the form of volatile or non-volatile memory comprising, without limitation, magnetic media, optical media, random access memory (RAM), read-only memory (ROM), removable media, or any other suitable local or remote memory component. It will be understood that there may be any suitable number and/or combination of memory modules 46 communicatively coupled to manager server 44.

Memory modules 46 may store any suitable data such as, for example, supply data 62, site data 36, invoice data 64, and/or audit data 66. Supply data 62 may comprise information regarding expired, current, and/or prospective supply contracts 22 between vendors 20 and customers 30. Supply data 62 may comprise any suitable type and/or combination of supply contract 22 between vendors 20 and customers 30. In some embodiments, supply contract 22 is a fixed rate contract, variable rate contract, or blended rate contract. A fixed rate contract may refer to supply contract 22 in which the price of utility resource 14 is fixed for a period of time (e.g., one year, two years, the term of supply contract 22, etc.). A variable rate contract may refer to supply contract 22 in which the price of utility resource 14 is set periodically (e.g., weekly, monthly, etc.) based at least in part on the price that vendor 20 pays in the wholesale market for utility resource 14. A blended rate contract may refer to supply contract 22 in which a portion (e.g., half) of the rate for utility resource 14 is fixed for the term of supply contract 22 and the remaining portion (e.g., half) of the rate for utility resource 14 periodically reset by vendor 20 based at least in part on market prices.

In some embodiments, supply contract 22 may be customized according to characteristics of vendor 20 and/or market conditions. For example, supply contract 22 may be a rate cap contract in which vendor 20 agrees to provide utility resource 14 to customer 30 at the market price with a guarantee that the rate will not rise above a certain value regardless of the current market price. As another example, supply contract 22 may be a fixed-bill contract (e.g., weather-protection contract) in which vendor 20 guarantees that customer 30 will not pay more than a fixed amount for utility resource 14 over a given time period (e.g., year, two years, etc.). The fixed amount that is charged to customer 30 may be based at least in part on the usage pattern of customer 30 over the previous period (e.g., year, two years, etc.) and adjustments for weather. As yet another example, supply contract 22 may be a fixed volume contract in which vendor 20 and/or customer 30 estimates the periodic (e.g., monthly, quarterly, etc.) utility usage 26 of customer 30 based at least in part on past utility usage 26, and vendor 20 procures the estimated quantity of utility resource 14 on behalf of customer 30. Customer 30 may be financially responsible for the difference between the estimated utility usage 26 and the actual amount of utility resource 14 purchased by vendor 20 for customer 30 on the spot market. Vendor 20 may calculate the difference between the estimated and actual utility usage 26 of customer 30 each hour, half-hour, and/or according to any suitable interval of time. Thus, supply data 62 in memory module 46 may comprise information regarding any number and/or combination of supply contracts 22.

In some embodiments, memory module 46 stores site data 36. As explained above, site data 36 may comprise information regarding the operation, performance, and/or maintenance of customer systems 28 at each site 24 associated with system 10. Site data 36 may comprise information regarding the equipment in customer system 28, the operating schedule of customer system 28, the quantity of utility resource 14 consumed by customer system 28, and/or the operating conditions associated with customer system 28.

According to certain embodiments, memory module 46 stores invoice data 64. Invoice data 64 may comprise information regarding past and current invoices 16 from vendors 20 to customers 30. Invoice data 64 may comprise any suitable billing information such as, for example, utility usage 26 and utility cost 12 for one or more billing periods. Invoice data 64 may comprise delivery fees, customer fees, supply fees, taxes, and/or any suitable information.

In some embodiments, memory module 46 stores audit data 66. Audit data 66 may comprise any suitable information regarding audits that platform 40 may perform on behalf of customers 30. In some embodiments, platform 40 may audit supply data 62, site data 36, and/or invoice data 64 of customer 30 to determine strategies 18 for reducing utility costs 12 and/or increasing efficiency of customer 30. By auditing supply data 62, site data 36, and/or invoice data 64, platform 40 may identify problems such as, for example, a malfunctioning meter 74, a meter reading error, a miscalculation of a utility rate, a miscalculation of taxes, and/or a billing error.

Platform 40 may determine any suitable strategy 18 for reducing utility costs 12 and/or increasing efficiency of customer 30. In some embodiments, strategy 18 may be for customer 30 to renegotiate supply contract 22 and/or execute a new supply contract 22 that includes a particular type of rate. For example, strategy 18 may recommend that customer 30 switch from a fixed rate contract to a blended rate contract. According to certain embodiments, strategy 18 may be for customer 30 to change operating parameters of site 24. For example, strategy 18 may recommend that customer 30 deactivate the air conditioning system at site 24 during weekends. In some embodiments, strategy 18 may recommend that customer 30 apply for exemptions and/or credits from vendor 20. For example, strategy 18 may recommend that customer 30 apply for credits from vendor 20 by switching from commercial status to residential status. By auditing supply data 62, site data 36, and/or invoice data 64 of customer 30, platform 40 may determine any suitable type and/or combination of strategies 18 for reducing utility costs 12 and/or increasing the efficiency of customer 30.

Although FIG. 1 illustrates separate memory modules 46 that store supply data 62, site data 36, invoice data 64, and audit data 66, it should be understood that supply data 62, site data 36, invoice data 64, and/or audit data 66 may be stored in one memory module 46, in multiple memory modules 46, in manager memory 48, and/or in a suitable configuration of memory devices.

In some embodiments, system 10 comprises one or more market centers 50 that are communicatively coupled to platform 40 via network 80. Market center 50 may transmit market data 38 regarding utility resources 14 to platform 40. Market center 50 may comprise an exchange, bank, market maker, broker, Alternative Trading System (ATS), and/or any suitable market participant. Market data 38 may comprise current and/or historical information regarding utility resources 14 such as, for example, market prices, trading volumes, and/or index values associated with utility resources 14. In some embodiments, market data 38 comprises information regarding derivatives of utility resources 14 such as, for example, options, swaps, and/or futures contracts. Platform 40 may use market data 38 from market center 50 to determine prices for supply contracts 22, to process invoices 16, and/or to manage utility costs 12 of customers 30. In some embodiments, market center 50 may be a commodity exchange such as, for example, the New York Mercantile Exchange (NYMEX), the Chicago Mercantile Exchange (CME), or Eurex. In other embodiments, market center 50 may be a financial news service organization such as, for example, Bloomberg, L.P.

According to certain embodiments, system 10 comprises one or more weather centers 60 that transmit weather data 42 to platform 40 via network 80. Weather data 42 may comprise current and/or historical information regarding the temperature, humidity, pressure, precipitation, and/or wind speed at one or more locations. Platform 40 may use weather data 42 to normalize usage of utility resources 14 at site 24. Weather center 60 may obtain weather data 42 from observations and/or measurements made at weather stations located within configurable distances of sites 24. Weather center 60 may be operated by any suitable entity that compiles and/or disseminates weather data 42. For example, weather center 60 may be operated by the National Weather Service (NWS), the National Climatic Data Center (NCDC), the National Climate Archive of Canada, and/or any suitable entity.

In some embodiments, system 10 comprises one or more clients 70. Client 70 represents any suitable local or remote end-user device that may be used to access one or more elements of system 10, such as manager server 44. User 68 may use client 70 to review supply data 62, site data 36, invoice data 64, audit data 66, market data 38, and/or any suitable information. Client 70 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 10. Client 70 may also comprise any suitable user interface such as a display, microphone, keyboard, or any other appropriate terminal equipment according to particular configurations and arrangements. It will be understood that system 10 may comprise any number and combination of clients 70.

In some embodiments, client 70 may comprise a graphical user interface (GUI) 72. GUI 72 is generally operable to tailor and filter data presented to user 68. GUI 72 may provide user 68 with an efficient and user-friendly presentation of supply data 62, site data 36, invoice data 64, and/or audit data 66. GUI 72 may comprise a plurality of displays having interactive fields, pull-down lists, and buttons operated by user 68. In one example, GUI 72 presents relevant invoice data 64 to user 68 and conceals the remaining information to reduce visual clutter. Then, upon receiving a request from user 68, GUI 72 expands the visual representation of invoice data 64 to display account information, contract information, and/or other suitable information. GUI 72 may include multiple levels of abstraction including groupings and boundaries. It should be understood that the term graphical user interface may be used in the singular or in the plural to describe one or more graphical user interfaces and each of the displays of a particular graphical user interface.

Each client 70 may be associated with one or more users 68. User 68 may comprise any individual, group of individuals, entity, machine, and/or mechanism that interacts with client 70. In some embodiments, user 68 may be a customer user 68a or consultant user 68b. Customer user 68a may comprise any user 68 associated with one or more customers 30 in system 10. Customer user 68a may be an executive, manager, accountant, engineer, technician, contractor, agent, employee, and/or any suitable representative of customer 30. Client 70 and/or manager server 44 may customize GUI 72 of client 70 associated with a particular customer user 68a based at least in part on the role (e.g., executive, manager, engineer, etc.) of the particular customer user 68a. For example, GUI 72 for accountant employed by customer 30 may display itemized cost data for each invoice 16 while GUI 72 for technician employed by customer 30 may display site data 36 comprising the efficiency of customer systems 28 at site 24. Thus, client 70 and/or manager server 44 may generate GUIs 72 that are tailored to the particular functions and/or responsibilities of the particular customer user 68a.

In some embodiments, user 68 is a consultant user 68b. Consultant user 68b may by an operator, agent, employee, and/or any suitable representative of a consulting company that provides consulting services to customer 30. In some embodiments, customer 30 may hire the consulting company to provide services directed to reducing utility costs 12 of customer 30. According to certain embodiments, the consulting company may own, operate, and/or maintain platform 40. In some embodiments, customer 30 may pay fees to the consulting company in exchange for receiving access to platform 40 and/or other services of consultant user 68b.

Vendors 20, sites 24, platform 40, market center 50, weather center 60, and/or clients 70 may be communicatively coupled via one or more networks 80. Network 80 may represent any number and combination of wireline and/or wireless networks suitable for data transmission. Network 80 may, for example, communicate interne protocol packets, frame relay frames, asynchronous transfer mode cells, and/or other suitable information between network addresses. Network 80 may include one or more intranets, local area networks, metropolitan area networks, wide area networks, cellular networks, all or a portion of the Internet, and/or any other communication system or systems at one or more locations.

In operation, platform 40 may manage utility costs 12 of customers 30. Platform 40 may receive invoice data 64 and supply data 62 from vendors 20 and/or customers 30. In some embodiments, platform 40 may receive site data 36 from sites 24. Based at least in part on supply data 62, site data 36, and/or invoice data 64, platform 40 may determine strategies 18 for reducing utility costs 12 of customers 30. In some embodiments, strategies 18 may comprise correcting errors identified by platform 40 such as, for example, billing errors and/or metering errors. According to certain embodiments, strategies 18 may comprise opportunities to reduce future utility costs 12. For example, strategies 18 may comprise renewing and/or renegotiating supply contract 22 with a particular type of rate, applying for credits from vendors 20, and/or changing one or more operating parameters of site 24. Platform 40 may cause client 70 to generate one or more GUIs 72 that display the determined strategies 18 to user 68.

Figure 2:
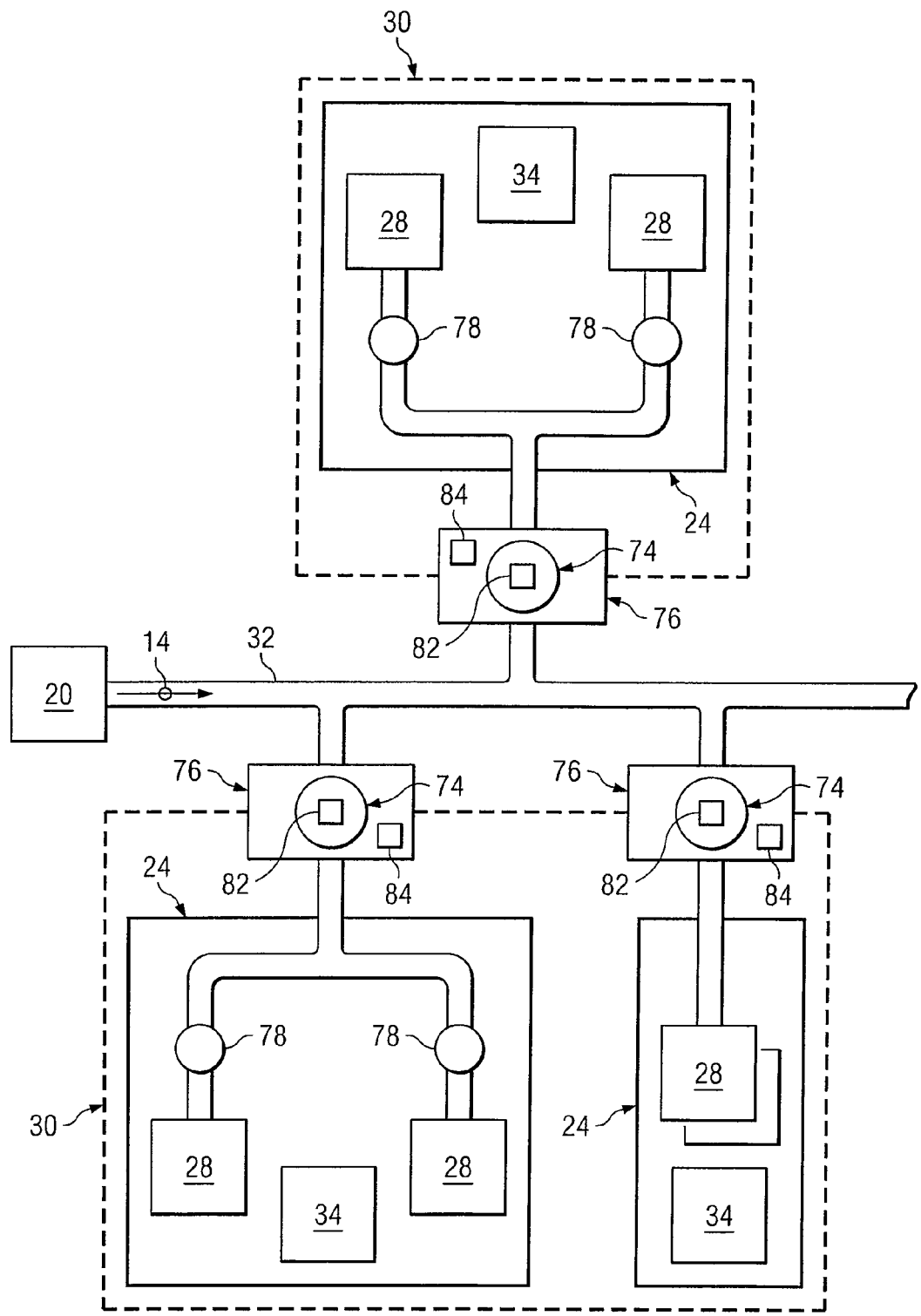
FIG. 2 illustrates the distribution of utility resources from vendors to customers in the system illustrated in FIG. 1, according to certain embodiments.

FIG. 2 illustrates the distribution of utility resources 14 from vendors 20 to customers 30, according to certain embodiments. The distribution of utility resources 14 in system 10 may comprise utility lines 32, meters 74, service points 76, and submeters 78. As explained above, vendor 20 may provide utility resources 14 to sites 24 via one or more utility lines 32. Utility line 32 may comprise any suitable equipment for providing utility resource 14 to customer 30. For example, utility line 32 may comprise one or more cables, wires, conductors, buses, channels, pipes, canals, conduits, ducts, and/or any suitable type and/or combination of equipment. In some embodiments, utility line 32 may be owned, operated, and/or maintained by vendor 20 and/or another business entity (e.g., "wires" company, distribution company, etc.).

Each site 24 in system 10 may comprise one or more meters 74. Meter 74 may measure the amount of utility resource 14 provided to site 24. Measuring the amount of utility resource 14 provided to site 24 may comprise measuring the volume, flow rate, mass, weight, energy, and/or quantity of utility resource 14 provided to site 24. Meter 74 may comprise any suitable measuring device such as, for example, an electromechanical meter, solid state meter, multiple tariff meter, automated meter reading (AMR) meter, time of usage (TOU) meter, interval usage meter, and/or any suitable type of meter. Each site 24 may comprise at least one meter 74 for each type of utility resource 14 delivered to site 24. In some embodiments, site server 34 associated with site 24 may collect and store measurements from meters 74 at site 24. Site server 34 may transmit the measurements from meters 74 to platform 40 as part of site data 36.

In some embodiments, each meter 74 in system 10 may be owned, operated, and/or maintained by vendor 20 and/or another utility company. Each meter 74 may be associated with a respective meter identifier 82. Meter identifier 82 for a particular meter 74 may comprise one or more alphanumeric characters and/or symbols that uniquely identify the particular meter 74. Meter identifier 82 may be printed on, stamped on, etched on, and/or otherwise associated with meter 74. In some embodiments, the manufacturer of meter 74 may determine and assign meter identifier 82 to meter 74.

According to certain embodiments, the physical location of each meter 74 may be referred to as a service point 76. Service point 76 may comprise the point of delivery of utility resource 14 from vendor 20 to customer 30. In some embodiments, service point 76 may represent the point at which ownership of utility resource 14 transfers from vendor 20 to customer 30. Site 24 may have one or more meters 74 for a particular type of utility resource 14. As a result, site 24 may also have one or more service points 76 for the particular type of utility resource 14.

Each service point 76 may be associated with a unique service point identifier 84. Service point identifier 84 for a particular service point 76 may comprise one or more alphanumeric characters and/or symbols that uniquely identify the particular service point 76. In some embodiments, a regulatory agency or other governing body determines and assigns a respective service point identifier 84 to each service point 76 in system 10. Service point identifier 84 for a particular service point 76 may be determined and assigned independently from meter identifier 82 for meter 74 at the particular service point 76. Accordingly, service point identifier 84 may not change if the existing meter 74 at service point 76 is replaced with a new meter 74 having a new meter identifier 82.

In some embodiments, site 24 may comprise one or more submeters 78. Each submeter 78 at site 24 may measure usage of utility resource 14 by a respective customer system 28 at site 24. Accordingly, if site 24 has multiple customer systems 28, each customer system 28 may be associated with a respective submeter 78. For example, site 24 may comprise one submeter 78 that measures electricity usage of a chiller plant at site 24 and another submeter 78 that measures electricity usage of a lighting system at site 24. Submeters 78 may permit customer 30 to monitor usage of utility resource 14 by each customer system 28 with more granularity than permitted by meter 74. Submeter 78 may comprise any suitable measuring device such as, for example, an electromechanical meter, solid state meter, multiple tariff meter, automated meter reading (AMR) meter, time of usage (TOU) meter, interval usage meter, and/or any suitable type of meter. In some embodiments, site server 34 associated with site 24 may collect and store measurements from submeters 78. Site server 34 may transmit the measurements from submeters 78 to platform 40 as part of site data 36.

FIG. 3 illustrates example invoice data 64 stored in memory module 46, according to certain embodiments. As explained above, invoice data 64 may comprise information regarding past and current invoices 16 from vendors 20 to customers 30. In some embodiments, invoice data 64 may comprise utility usages 26 and utility costs 12. Utility usage 26 may represent the amount of utility resource 14 consumed by at least a portion of site 24 during a given billing period (e.g., week, month, quarter, etc.). In some embodiments, utility usage 26 may represent the amount of utility resource 14 delivered by vendor 20 to a particular service point 76 at site 24 during a given billing period. Accordingly, if site 24 comprises more than one service point 76, site 24 may be associated with more than one value of utility usage 26 for a given billing period. Utility usage 26 may be expressed in any suitable units. For example, where utility resource 14 is electricity, utility usage 26 may be expressed as kilowatt hours (kWh), joules (J), and/or any suitable unit. As another example, where utility resource 14 is natural gas, utility usage 26 may be expressed as cubic feet, British Thermal Units (BTUs), and/or any suitable unit. As yet another example, where utility resource 14 is water, utility usage 26 may be expressed as cubic meters, cubic feet, and/or any suitable unit.

In some embodiments, invoice data 64 comprises utility costs 12. Utility cost 12 may represent the monetary amount that vendor 20 charges to customer 30 for utility resource 14 consumed by at least a portion of site 24 during a given billing period. In some embodiments, utility cost 12 represents the monetary amount that vendor 20 charges for utility resource 14 delivered to a particular service point 76 at site 24.

In some embodiments, invoice data 64 may comprise a site address, account identifier 86, vendor name, and meter identifier 82 in association with each value of utility usage 26 and/or utility cost 12. A site address may indicate the street address of site 24 that consumed utility resource 14 associated with utility usage 26 and/or utility cost 12. Account identifier 86 may comprise one or more alphanumeric characters and/or symbols that identify the vendor account under which utility resource 14 is provided to site 24. Meter identifier 82 may identify the particular meter 74 that measured the amount of utility resource 14 delivered to service point 76 at site 24.

In some embodiments, invoice data 64 may be indexed according to service point identifier 84. Thus, platform 40 may store service point identifier 84 in association with each utility usage 26 and utility cost 12 from each invoice 16.

Indexing invoice data 64 according to service point identifier 84 may permit platform 40 to efficiently and accurately respond to queries for invoice data 64. In some embodiments, indexing invoice data 64 according to service point identifier 84 may permit platform 40 to more accurately respond to queries than if invoice data 64 were indexed only according to meter identifier 82. Because meter 74 at site 24 may be occasionally replaced, meter identifier 82 associated with site 24 may change. Where site 24 comprises meter 74 that was recently replaced, a query that is based on meter identifier 82 of the current meter 74 may not retrieve historical invoice data 64 associated with the prior meter 74. In contrast, service point identifier 84 of service point 76 does not change when meter 74 at service point 76 is replaced. Thus, a query that is based on service point identifier 84 may retrieve current and historical invoice data 64 associated with current and prior meter(s) 74 at service point 76. As a result, indexing invoice data 64 in platform 40 according to service point identifier 84 may permit platform 40 to accurately respond to queries for invoice data 64.

An example illustrates certain embodiments. A particular site 24 located at 123 Main Street comprises two service points 76—Service Point A and Service Point B. Meter U at Service Point A was replaced on Nov. 3, 2003. In this example, if user 68 wants to retrieve from platform 40 all historical and current invoice data 64 associated with Service Point A, user 68 may input into client 70 a query that comprises "A" as service point identifier 84. In response to the query, manager server 44 may identify and retrieve from memory module 46 all records associated with "A" as service point identifier 84. Thus, even though a portion of the historical invoice data 64 is associated with a different meter identifier 82 (i.e., Meter Identifier U) than the current invoice data 64 (i.e., Meter Identifier T), manager server 44 may retrieve and provide to user 68 all of the requested invoice data 64.

For similar reasons, indexing invoice data 64 according to service point identifier 84 may permit platform 40 to more accurately respond to queries than if invoice data 64 were indexed only according to account identifier 86. Because customers 30 may occasionally change vendors 20 and/or accounts, account identifiers 86 associated with site 24 may change. Where site 24 is associated with a new account, a query that is based on account identifier 86 of the new account may not yield historical invoice data 64 associated with the prior account. In contrast, service point identifier 84 of a particular service point 76 does not change when account for site 24 changes. Thus, a query that is based on service point identifier 84 may retrieve current and historical invoice data 64 associated with current and prior accounts.

In some embodiments, indexing invoice data 64 according to service point identifier 84 may permit platform 40 to more accurately respond to queries than if invoice data 64 were indexed only according to street addresses of sites 24. As explained above, a particular site 24 may have multiple service points 76. If user 68 wishes to retrieve invoice data 64 for a particular service point 76 at site 24 having multiple service points 76, a query based on the street address of site 24 may yield unwanted invoice data 64 associated with other service points 76 at site 24. For example, with respect to the illustrated invoice data 64, a query comprising a street address of 123 Main Street would yield invoice data 64 for two service points 76—Service Point A and Service Point B. If user 68 wishes to only retrieve invoice data 64 associated with Service Point A, platform 40 may permit user 68 to submit query based on service point identifier 84 rather than street address.

Although the foregoing examples describe invoice data 64 that is indexed according to service point identifier 84, it should be understood that any type of data stored in platform 40 may be indexed according to service point identifier 84. In some embodiments, supply data 62, site data 36, and/or audit data 66 stored in platform 40 may be indexed according to service point identifier 84. For example, audit data 66 may comprise strategies 18 for reducing utility costs 12 of customer 30. Each strategy 18 in audit data 66 may be indexed according to the particular service point identifier 84 for the particular service point 76 to which strategy 18 applies. Thus, any type and/or combination of data stored in platform 40 may be indexed according to service point identifier 84.

Figure 4:
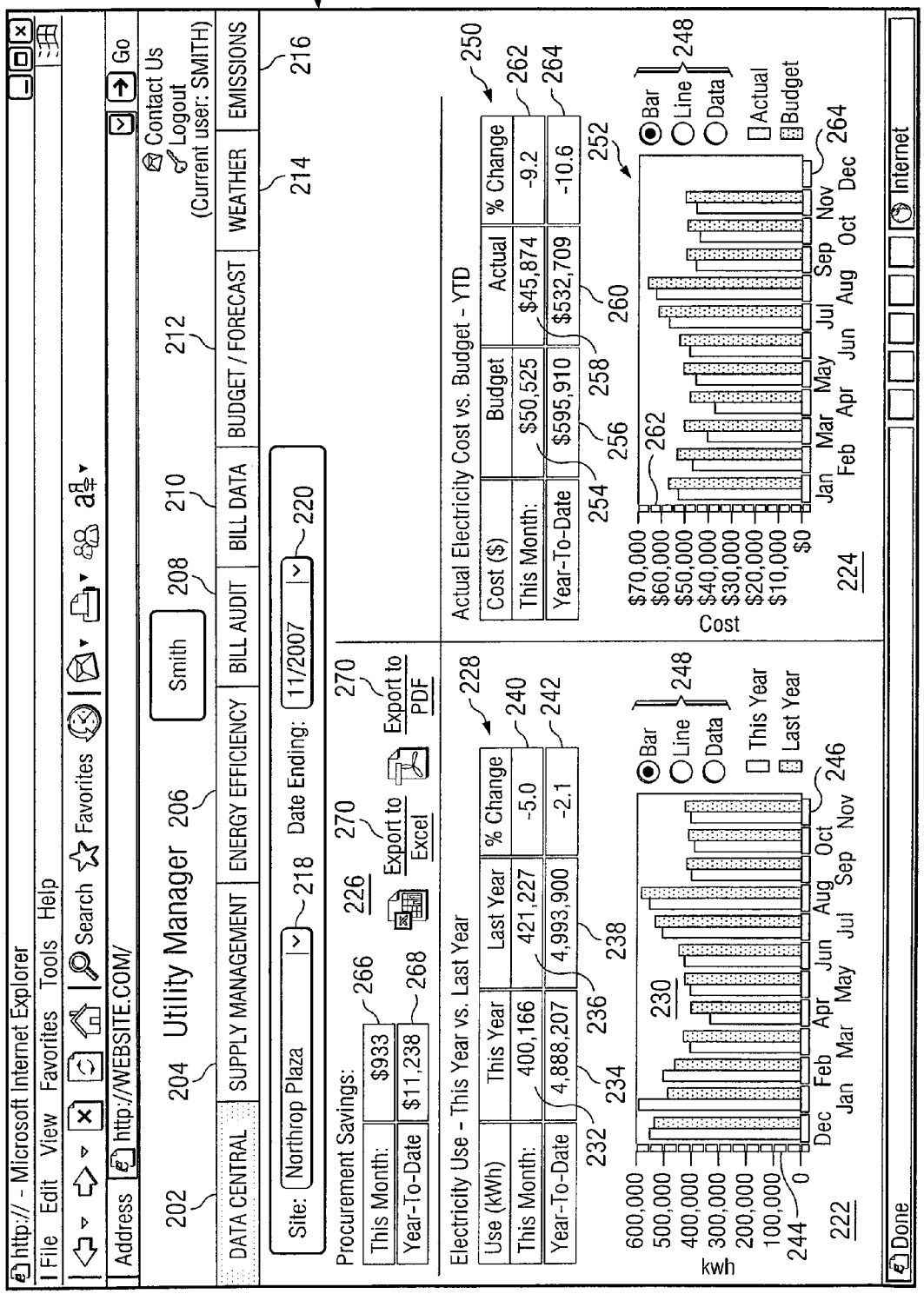
FIG. 4 illustrates an example graphical user interface (GUI) that displays invoice data, according to certain embodiments.

FIG. 4 illustrates an example GUI 72 that provides an easy-to-use interactive interface for user 68 of client 70 to search and review supply data 62, site data 36, invoice data 64, and/or audit data 66. In some embodiments, GUI 72 comprises a plurality of displays having interactive fields, pull-down lists, and/or buttons operated by user 68. In some embodiments, GUI 72 comprises a plurality of tabs 202-216, a site field 218, a date field 220, a usage display 222, a cost display 224, and a savings table 226.

Tabs may allow user 68 to navigate to different screens comprising different types of information. GUI 72 may comprise a data central tab 202 that navigates to a screen comprising historical and current invoice data 64. In some embodiments, GUI 72 comprises a supply management tab 204 that navigates to a screen comprising information regarding supply contracts 22, an energy efficiency tab 206 that navigates to a screen comprising information regarding efficiency at site 24, and/or an audit tab 208 that navigates to a screen comprising strategies 18 for reducing utility costs 12. According to certain embodiments, GUI 72 comprises a bill data tab 210 that navigates to a screen comprising detailed information regarding invoices 16, a budget tab 212 that navigates to a screen comprising information regarding utility budgets, a weather tab 214 that navigates to a screen comprising information regarding utility usage 26 that is normalized with respect to weather, and/or an emissions tab 216 that navigates to a screen comprising information regarding the emission of pollutants attributable to sites 24. In the illustrated example, the data central tab 202 has been selected by user 68.

Site field 218 and date field 220 may permit user 68 to formulate a query for invoice data 64 associated with at least one site 24 and/or at least one date range. Platform 40 may retrieve invoice data 64 based at least in part on the particular site 24 and date range selected by user 68 in site field 218 and date field 220, respectively. Client 70 may display the retrieved invoice data 64 to user 68.

Usage display 222 may show information regarding utility usage 26 at the selected site 24 during the selected date range. In some embodiments, usage display 222 shows a comparison of utility usage 26 for a current period (e.g., month, year, etc.) with utility usage 26 for a prior period (e.g., month, year, etc.). Usage display 222 may comprise usage table 228 and usage graph 230.

Usage table 228 may provide a comparison of utility usage 26 for at least one time period with utility usage 26 for another time period. In some embodiments, usage table 228 comprises a field 232 showing utility usage 26 at the selected site 24 during the current month and a field 234 showing the total utility usage 26 at the selected site 24 during the current year. Usage table 228 may comprise a field 236 showing utility usage 26 at the selected site 24 during the same month of a prior year and a field 238 showing the total utility usage 26 at the selected site 24 during the prior year. In some embodiments, usage table 228 may comprise a field 240 showing the difference (e.g., represented as a percentage, fraction, whole number, etc.) between the values in fields 232 and 236. According to certain embodiments, usage table 228 may comprise a field 242 showing the difference between the values in fields 234 and 238.

Usage graph 230 may graphically illustrate utility usage 26 at the selected site 24 during one or more periods of time. In some embodiments, usage graph 230 may represent a comparison of utility usage 26 during each month of the current year with utility usage 26 during each month of a prior year. Usage graph 230 may comprise a first axis 244 representing utility usage 26 and a second axis 246 representing time periods. In some embodiments, usage graph 230 may be associated with one or more format buttons 248. User 68 may select format button 248 to change the format of usage graph 230. For example, format button 248 may allow user 68 to format usage graph 230 as a bar graph, line graph, or data chart.

In some embodiments, GUI 72 may comprise cost display 224. Cost display 224 may show information regarding utility costs 12 at the selected site 24 during the selected date range. In some embodiments, cost display 224 shows a comparison of utility costs 12 for a current time period with utility costs 12 for a prior time period. Cost display 224 may comprise cost table 250 and cost graph 252.

Cost table 250 may provide a comparison of utility costs 12 for at least one period of time with utility costs 12 for another period of time. In some embodiments, cost table 250 comprises a field 254 showing the utility costs 12 at the selected site 24 during the current month and a field 256 showing the total utility costs 12 at the selected site 24 during the current year. Cost table 250 may comprise a field 258 showing the utility costs 12 at the selected site 24 during the same month of a prior year and a field 260 showing the total utility costs 12 at the selected site 24 during the prior year. In some embodiments, cost table 250 may comprise a field 262 showing the difference (e.g., represented as a percentage, fraction, whole number, etc.) between the values in fields 254 and 258. According to certain embodiments, cost table 250 may comprise a field 264 showing the difference between the values in fields 256 and 260.

Cost graph 252 may graphically illustrate the utility costs 12 at the selected site 24 during one or more periods of time. In some embodiments, cost graph 252 may represent a comparison of the utility costs 12 during each month of the current year with the utility costs 12 at the selected site 24 during each month of a prior year. Cost graph 252 may comprise a first axis 262 representing utility cost 12 and a second axis 264 representing time periods (e.g., months). In some embodiments, cost graph 252 may be associated with one or more format buttons 248. User 68 may select format button 248 to change the format of cost graph 252. For example, format button 248 may allow user 68 to format cost graph 252 as a bar graph, line graph, or data chart.

In some embodiments, GUI 72 displays savings table 226. Savings table 226 may display the reduction or increase in utility costs 12 that customer 30 has obtained by implementing one or more strategies 18 determined by platform 40. For example, platform 40 may determine strategy 18 for renewing supply contract 22 associated with the selected site 24. In some embodiments, strategy 18 may direct customer 30 to select a particular vendor 20 for supply contract 22. If customer 30 implements strategy 18, platform 40 may thereafter determine a reduction or increase in utility costs 12 of customer 30 as a result of contracting with the selected vendor 20 rather than with other vendors 20. Savings table 226 may comprise a field 266 that displays the determined reduction or increase in utility costs 12 during a given month and a field 268 that displays the determined reduction or increase in utility costs 12 during a given year.

In some embodiments, GUI 72 may display one or more export buttons 270. By selecting export button 270, user 68 may launch another application and export data from GUI 72 to the other application. The other application may be any suitable application including, but not limited to, a spreadsheet application, word processing application, document imaging application, and/or other type of application.

Figure 5:
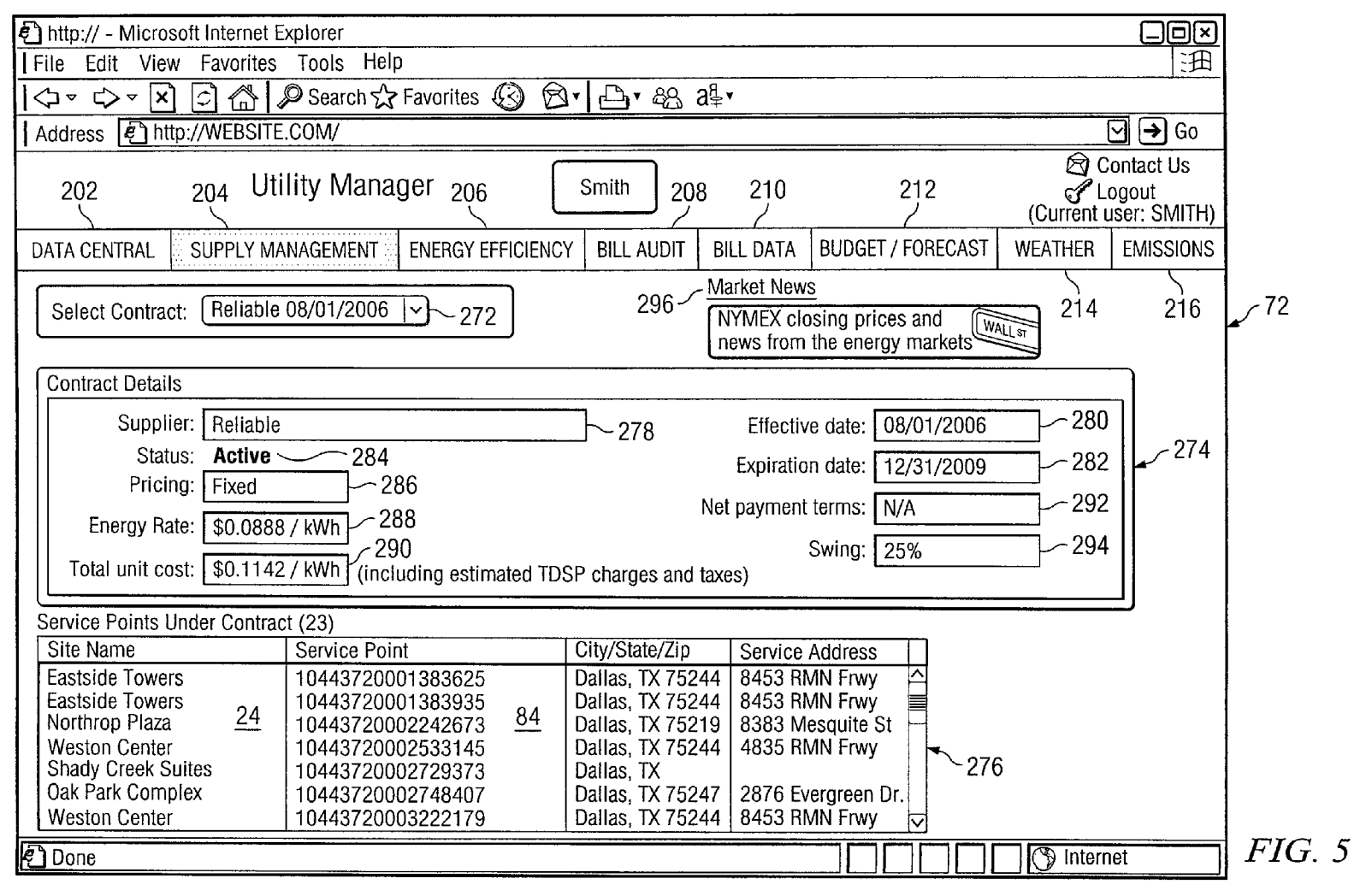

FIG. 5 illustrates an example GUI 72 that comprises information regarding supply contracts 22, according to certain embodiments. User 68 may navigate to the illustrated GUI 72 by selecting the supply management tab 204. GUI 72 may comprise a search field 272, contract display 274, and service point table 276.

Search field 272 may permit user 68 to select one or more supply contracts 22 for which to view data. In the illustrated example, user 68 selected supply contract 22 associated with vendor 20 named Reliable and with an effective date of Aug. 1, 2006. In response to the selection of supply contract 22, platform 40 may retrieve supply data 62 associated with the selected supply contract 22. Client 70 may display the retrieved supply data 62 to user 68.

Contract display 274 may show contract terms and/or other information associated with the selected supply contract 22. In some embodiments, contract display 274 may comprise a field 278 that displays the name of vendor 20 for the selected contract, a field 280 that displays the effective date of the selected contract, and a field 282 that displays the expiration date of the selected contract. According to certain embodiments, contract display 274 may show a field 284 indicating the current status of the selected supply contract 22. Field 284 may indicate any suitable status of the selected contract such as, for example, active, expired, inactive, suspended, and/or pending approval. In some embodiments, contract display 274 comprises field 286 indicating the type of pricing specified by the selected contract. Field 286 may indicate any suitable type of pricing such as, for example, fixed rate, variable rate, blended rate, or fixed volume. According to certain embodiments, contract display 274 may comprise field 288 showing the current rate for utility resource 14 under the selected contract and field 290 showing the total unit cost for utility resource 14 under the selected contract. In some embodiments, contract display 274 may comprise field 292 indicating payment terms specified by the selected contract such as, for example, a preferred method of payment or a discount for early payment. According to certain embodiments, contract display 274 may comprise field 294 indicating an amount of a swing option associated with the selected supply contract 22.

Service point table 276 may comprise information regarding one or more service points 76 associated with the selected supply contract 22. In some embodiments, service point table 276 lists each service point 76 to which vendor 20 is obligated to deliver utility resources 14 under the selected supply contract 22. Service point table 276 may display the names of sites 24, corresponding service point identifiers 84, and the addresses of sites 24.

In some embodiments, GUI 72 may comprise a market button 296. Market button 296 may permit user 68 to launch a display of current and/or historical market data 38 for utility resource 14 associated with the selected contract. GUI 72 may be configured to display market data 38 as a pop-up window and/or as a separate screen.

Figure 6:
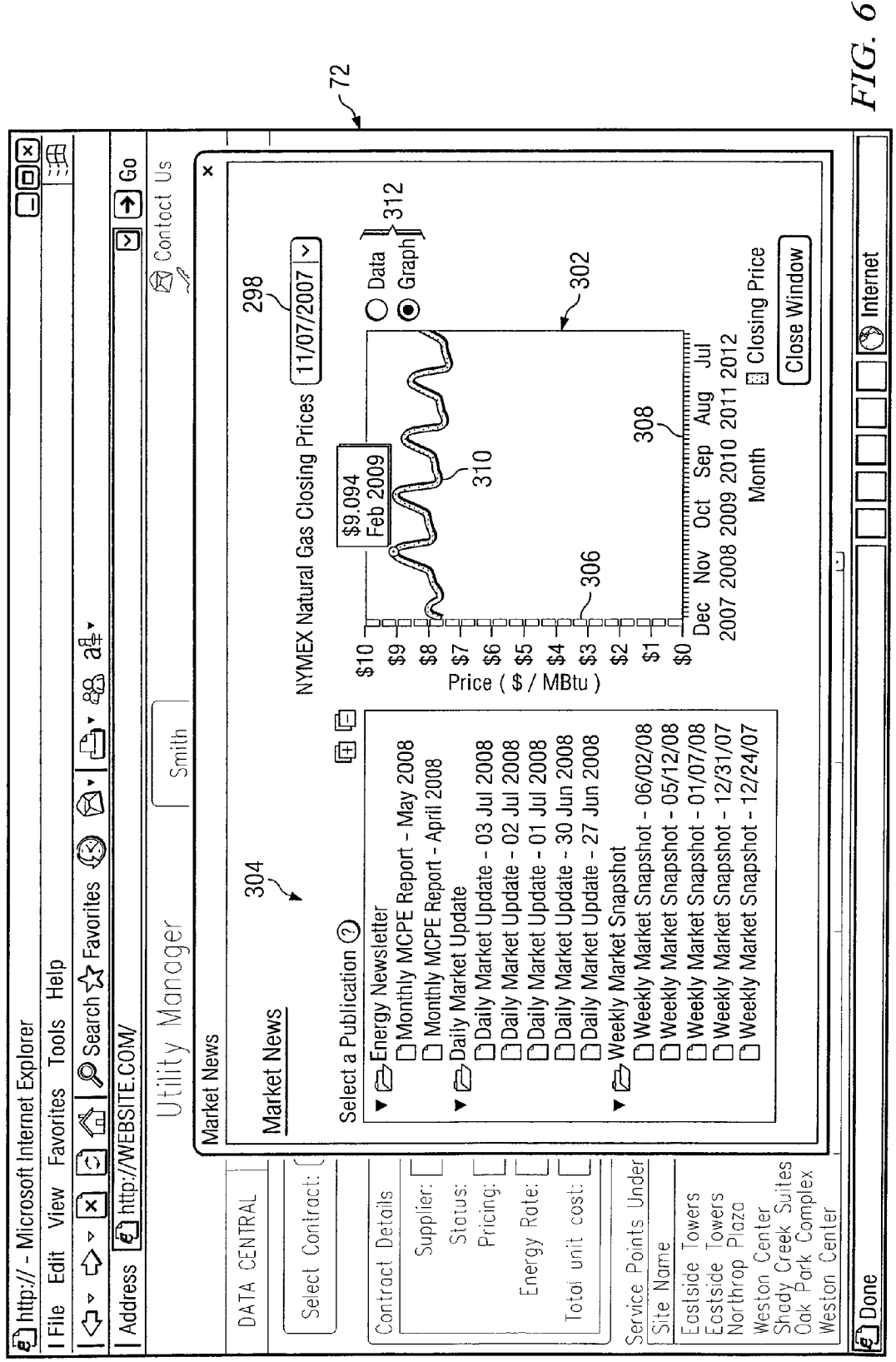
FIG. 6 illustrates an example GUI that displays market data, according to certain embodiments.

FIG. 6 illustrates an example GUI 72 that displays market data 38, according to certain embodiments. GUI 72 may comprise a date field 298, market data graph 302, and a news table 304. Date field 298 may permit user 68 to specify a particular date and/or date range for displaying market data 38 in market data graph 302.

Market data graph 302 may display market prices associated with utility resource 14. In some embodiments, market data graph 302 may display closing prices of futures contracts for utility resource 14. The displayed closing prices may be based on market data 38 from one or more market centers 50 such as, for example, the New York Mercantile Exchange (NYMEX). In some embodiments, market data graph 302 comprises a first axis 306 representing the market price (e.g., closing price) of futures contracts associated with utility resource 14 and a second axis 308 representing settlement dates of the futures contracts. In some embodiments, market data graph 302 comprises at least one price line 310 indicating the respective prices for futures contract with different settlement dates. By selecting a particular point of price line 310 (e.g., by positioning a cursor over a particular point in price line 310), user 68 may view the current price for a futures contract with a settlement date corresponding to the selected point. In some embodiments, market data graph 302 may be associated with one or more format buttons 312 that allow user 68 to configure market data graph 302 as a line graph, bar graph, and/or data chart.

News table 304 may comprise a list of one or more publications regarding utility markets such as, for example, electricity markets, gas markets, oil markets, and/or any suitable market. The listed publications may comprise press releases, newspaper articles, news letters, market reports, and/or any suitable documents regarding utility markets. Each listed publication in news table 304 may comprise a hyperlink, embedded link, and/or inline link that, upon selection, causes GUI 72 to display at least a portion of the selected publication. Thus, GUI 72 may allow user 68 to easily view market data 38 and market news associated with utility resource 14.

FIG. 7 illustrates an example GUI 72 that displays information regarding the efficiency of one or more sites 24, according to certain embodiments. User 68 may navigate to the illustrated GUI 72 by selecting the efficiency tab 206. GUI 72 may comprise a date field 314 and an efficiency chart 316.

Date field 314 may permit user 68 to specify a time period for displaying information regarding efficiency of sites 24. In some embodiments, date field 314 may be associated with one or more buttons 318 that allow user 68 to specify a date range for the information to be displayed. For example, user 68 may select button 318 to display information for a twelve-month period, button 318 to display information for each month in the current calendar and/or fiscal year, and button 318 to display information for the month starting on, ending on, and/or comprising the date selected in date field 314.

Efficiency chart 316 may comprise information regarding utility usage 26 and/or efficiency of one or more sites 24. In some embodiments, efficiency chart 316 comprises names of a plurality of sites 24 associated with a particular customer 30, vendor 20, and/or supply contract 22 (illustrated as column 320). Efficiency chart 316 may display a respective area of each site 24 (illustrated as column 322). Efficiency chart 316 may display the amount of utility resources 14 consumed at each site 24 during the selected date range (illustrated as column 324). In some embodiments, efficiency chart 316 displays the amount of utility resources 14 consumed per unit area at each site 24 during the selected date range (illustrated as column 326). According to certain embodiments, efficiency chart 316 displays the cost of utility resources 14 consumed at each site 24 during the selected date range (illustrated as column 328) and the amount of utility resources 14 consumed per unit area at each site 24 during the selected date range (illustrated as column 330).

In some embodiments, efficiency chart 316 may comprise one or more fields that indicate the average usage and average cost of utility resources 14 for the selected sites 24. For example, efficiency chart 316 may comprise field 332 that indicates the average usage of utility resources 14 during the selected date range and field 334 that indicates the average usage per unit area of utility resources 14 during the selected date range. Efficiency chart 316 may comprise field 336 that indicates the average cost of utility resources 14 during the selected date range and field 338 that indicates the average cost per unit area of utility resources 14 during the selected date range. According to certain embodiments, for each site 24, efficiency chart 316 may display the variance (illustrated as column 340) between utility usage 26 of that site 24 and the average utility usage 26 for the displayed sites 24 during the selected date range. Similarly, efficiency chart 316 may display the variance (illustrated as column 342) between utility costs 12 of each site 24 and the average utility cost 12 for the displayed sites 24 during the selected date range In some embodiments, GUI 72 may display one or more export buttons 340 in association with efficiency chart 316. By selecting export button 340, user 68 may launch another application and export data from GUI 72 to the other application. The other application may be any suitable application including, but not limited to, a spreadsheet application, word processing application, document imaging application, and/or other type of application.

According to certain embodiments, GUI 72 may display one or more format buttons 342. Format button 342 may allow user 68 to configure data section as a graph (e.g., bar graph, line graph, etc.) based on utility usage 26 per unit area, a graph (e.g., bar graph, line graph, etc.) based on utility cost 12 per unit area, and/or a data chart.

Figure 8:
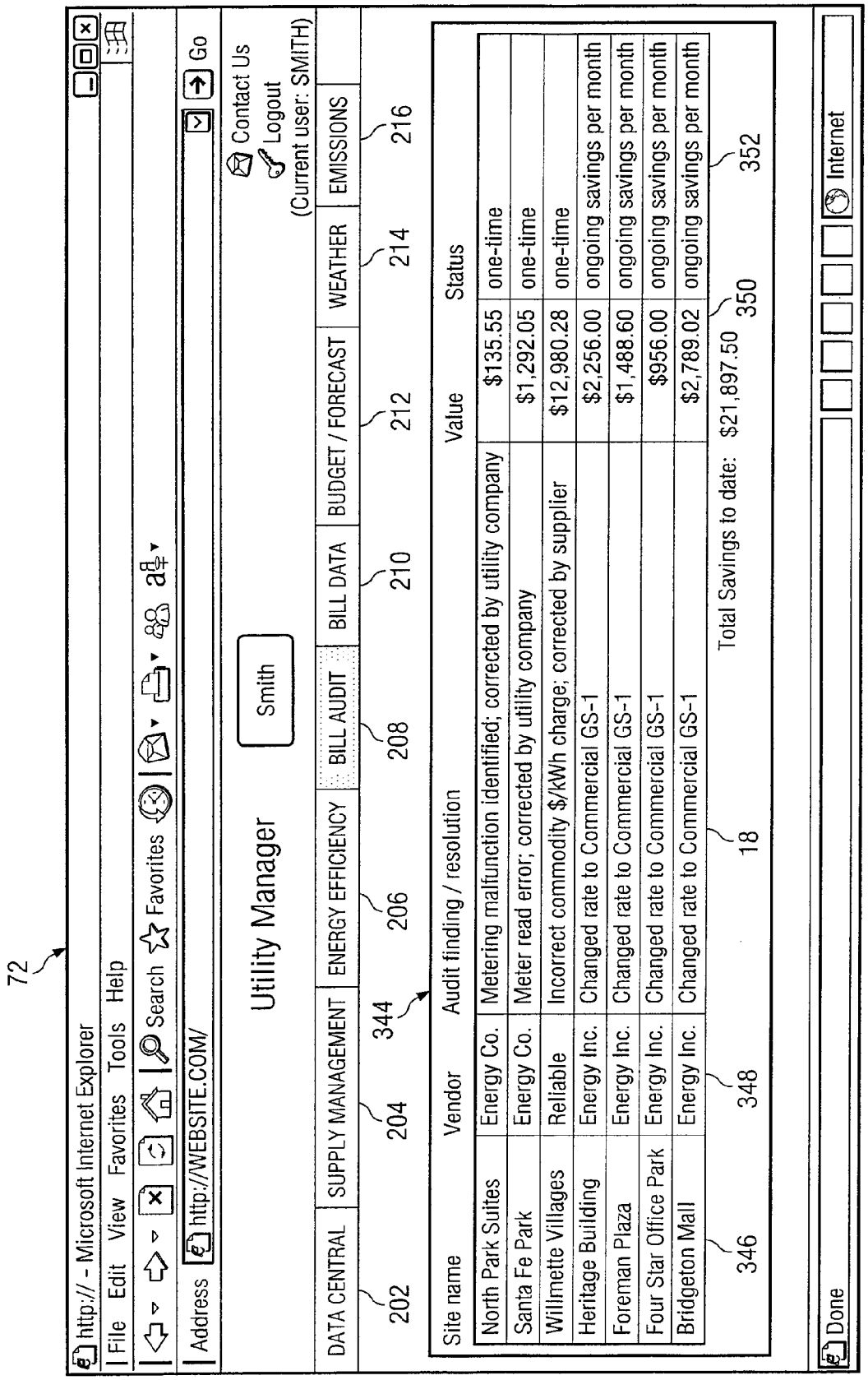
FIG. 8 illustrates an example GUI that displays audit data, according to certain embodiments.

FIG. 8 illustrates an example GUI 72 that displays audit data 66 determined by platform 40, according to certain embodiments. User 68 may navigate to the illustrated GUI 72 by selecting the audit tab 208. As explained above, platform 40 may audit supply data 62, site data 36, and/or invoice data 64 to determine strategies 18 for customer 30 to reduce utility costs 12 and/or increase the efficiency of sites 24. In some embodiments, the determined strategies 18 comprise fixing equipment (e.g., a malfunctioning meter 74) and/or correcting billing errors (e.g., a meter reading error, a miscalculation of a utility rate, a miscalculation of taxes, etc.). According to certain embodiments, the determined strategies 18 comprise restructuring supply contract 22, changing operating parameters of site 24, and/or applying for credits from vendor 20. Platform 40 may determine any suitable type and/or combination of strategies 18 for reducing utility costs 12 and/or increasing the efficiency of sites 24.

GUI 72 may comprise an audit chart 344 that displays strategies 18 to user 68.

The displayed strategies 18 may be associated with a particular customer 30, site 24, service point 76, supply contract 22, and/or vendor 20. In some embodiments, audit chart 344 displays a plurality of sites 24 (illustrated as column 346) in association with the respective vendor 20 for each site 24 (illustrated as column 348). For each site 24, audit chart 344 may display one or more strategies 18 determined by platform 40. Audit chart 344 may display a monetary value (illustrated as column 350) that represents the monetary savings that have been and/or can be realized by implementing the corresponding strategy 18. In some embodiments, audit chart 344 displays a status (illustrated as column 352) for each strategy 18, indicating how often strategy 18 may be implemented (e.g., once, monthly, etc.).

FIG. 9 illustrates an example GUI 72 that displays detailed invoice data 64, according to certain embodiments. User 68 may navigate to the illustrated GUI 72 by selecting the bill data tab 210. GUI 72 may comprise a site field 354, account field 356, and invoice chart 358. Site field 354 may permit user 68 to select at least one site 24 associated with customer 30. In response to the selection of site 24, platform 40 may determine one or more accounts associated with the selected site 24. Account field 356 may permit user 68 to select at least one of the determined accounts associated with the selected site 24. Platform 40 may then retrieve invoice data 64 associated with the selected account. Client 70 may display the retrieved invoice data 64 to user 68.

Invoice chart 358 may display information based at least in part on invoices 16 associated with the selected site 24. In some embodiments, invoice chart 358 displays the bill date (illustrated as column 360) and the number of days in the billing period (illustrated as column 362) for each invoice 16. According to certain embodiments, for each invoice 16, invoice chart 358 may display total utility usage 26 (illustrated as column 364), and average utility usage 26 per day (illustrated as column 368) at site 24. In some embodiments, invoice chart 358 may show, for each invoice 16, the billed demand (illustrated as column 370) and the actual demand (illustrated as column 372) at site 24. According to certain embodiments, invoice chart 358 may display, for each invoice 16 associated with site 24, the utility costs 12 (illustrated as column 374) excluding taxes and fees, the average utility costs 12 per day (illustrated as column 376), and the average utility costs 12 per unit of utility resource 14 (illustrated as column 378). In some embodiments, for each invoice 16, invoice chart 358 may display the taxes (illustrated as column 380), fees (illustrated as column 382), and fees per unit of utility resource 14 delivered to site 24 (illustrated as column 384). According to certain embodiments, invoice chart 358 may display, for each invoice 16, the total cost (illustrated as column 386) of utility resource 14 delivered to site 24.

In some embodiments, GUI 72 may display one or more export buttons 388 in association with invoice chart 358. By selecting export button 388, user 68 may launch another application and export data from GUI 72 to the other application. The other application may be any suitable application including, but not limited to, a spreadsheet application, word processing application, document imaging application, and/or other type of application.

In some embodiments, invoice chart 358 may be sortable by user 68. User 68 may select at least one cell in a particular column in order to sort the entries in invoice chart 358 in ascending or descending order.

According to certain embodiments, invoice chart 358 may comprise one or more links (illustrated as column 390) that permit user 68 to view an image of invoice 16. By selecting link, user 68 may launch an application that displays an image of the actual invoice 16 received from vendor 20. The application that displays image may be a spreadsheet application, word processing application, document imaging application, and/or other type of application.

FIG. 10 illustrates an example GUI 72 that displays information regarding a budget for utility resource 14, according to certain embodiments. User 68 may navigate to the illustrated GUI 72 by selecting the budget tab 212. GUI 72 may comprise a site field 392 and a budget chart 394. Site field 392 may permit user 68 to select a particular site 24 for displaying information in budget chart 394.

Budget chart 394 may display a comparison of actual utility costs 12 to budgeted utility costs 12. In some embodiments, budget chart 394 displays information for a plurality of billing periods (illustrated as column 396). For each billing period, budget chart 394 may display a monetary amount (illustrated as column 398) that customer 30 budgeted to spend on utility costs 12, excluding taxes and fees, for the selected site 24. In some embodiments, budget chart 394 may display, for each billing period, a monetary amount that customer 30 budgeted to spend on fees for utility resource 14 (illustrated as column 402) and a monetary amount that customer 30 budgeted to spend on taxes for utility resource 14 (illustrated as column 404) for the selected site 24. In some embodiments, budget chart 394 may display, for each billing period, a monetary amount that customer 30 budgeted to spend on utility resource 14 including taxes and fees (illustrated as column 406) and a monetary amount that customer 30 actually spent on utility resource 14 delivered to the selected site 24, including taxes and fees (illustrated as column 408). According to certain embodiments, budget chart 394 may comprise fields 412-418 displaying the total monetary amounts that customer 30 budgeted for utility costs 12, fees, and taxes for all of the displayed billing periods (e.g., an entire year) and field 422 displaying the total monetary amount that customer 30 actually spent for utility resources 14 delivered to site 24. In some embodiments, for each billing period, budget chart 394 may display the variance (illustrated as column 410) between the budgeted cost illustrated in column 406 and the actual cost illustrated in column 408.

In some embodiments, GUI 72 may display one or more export buttons 422 in association with budget chart 394. By selecting export button 422, user 68 may launch another application and export data from GUI 72 to the other application. The other application may be any suitable application including, but not limited to, a spreadsheet application, word processing application, document imaging application, and/or other type of application.

Figure 11:
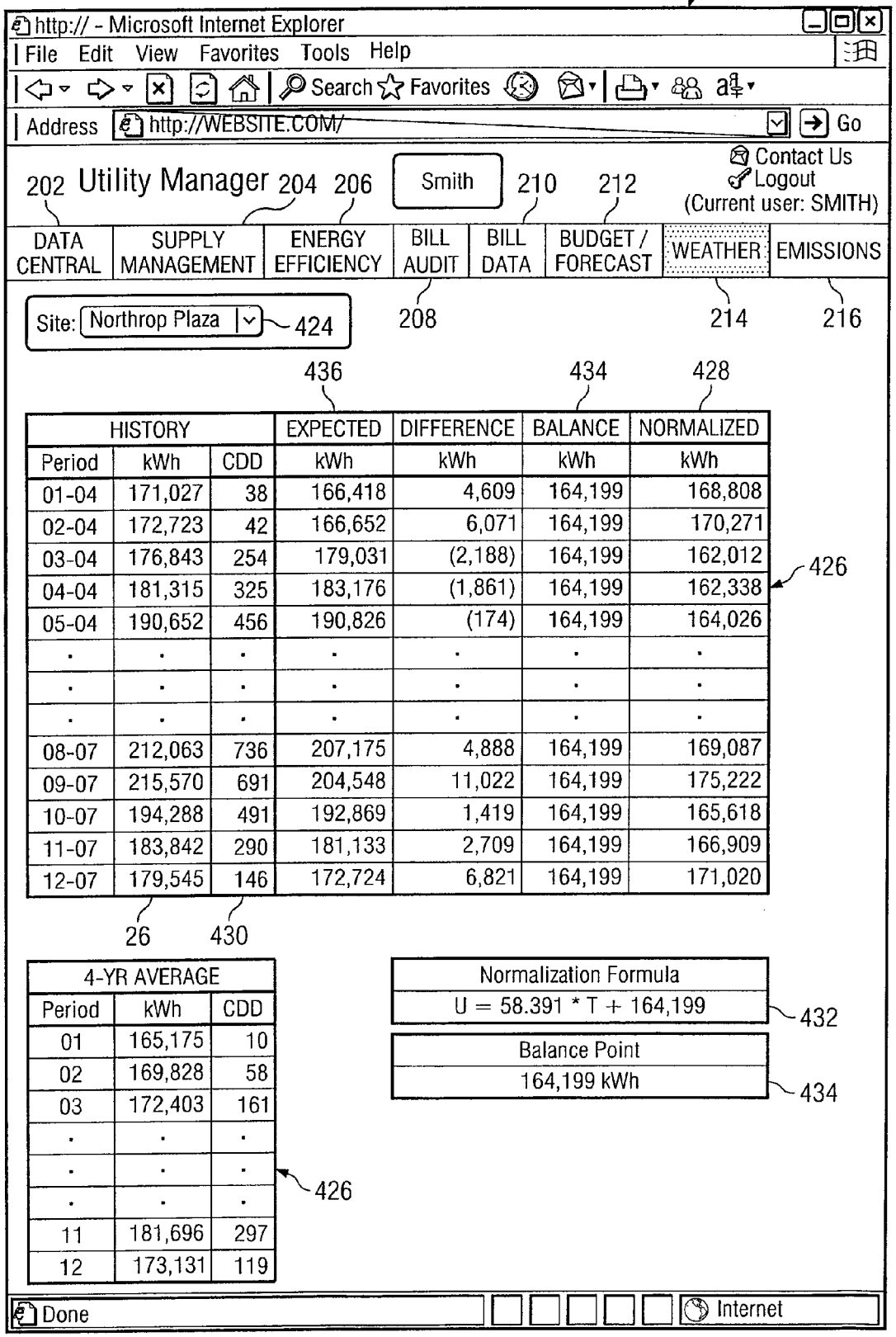
FIG. 11 illustrates an example GUI that displays weather data, according to certain embodiments.

FIG. 11 illustrates an example GUI 72 that displays weather data 42, according to certain embodiments. User 68 may navigate to the illustrated GUI 72 by selecting the weather tab 214. GUI 72 may comprise a site field 424 and one or more weather charts 426. Site field 424 may permit user 68 to select a particular site 24 for which user 68 wishes to normalize utility usage 26.

Weather charts 426 may display information regarding the normalization of utility usage 26 at the selected sites 24. As explained above, platform 40 may use weather data 42 to normalize utility usage 26 at site 24 with respect to weather. Normalizing utility usage 26 for site 24 may comprise increasing or decreasing the actual utility usage 26 at site 24 to account for fluctuations in weather. Utility usage 26 that is normalized with respect to weather may be referred to as normalized usage 428. Normalized usage 428 may indicate to user 68 whether factors other than weather are contributing or have contributed to changes in utility usage 26 at site 24. Such factors may include equipment malfunctions, changes in operating parameters, metering errors, leaks in utility lines 32, and/or other factors that, unlike weather, may be corrected by user 68 to reduce utility costs 12.

Platform 40 may receive weather data 42 from weather center 60. Weather data 42 may include any suitable information regarding the weather at each site 24 of customer 30. Information regarding the weather at site 24 may comprise information regarding the weather near and/or within a configurable distance of site 24 (e.g., at the nearest weather station). In some embodiments, weather data 42 comprises the high temperature, low temperature, average temperature, and/or mean temperature each day. For each site 24, platform 40 may determine a number of degree-days 430 for each day based at least in part on weather data 42. Degree-day 430 may refer to a measurement unit for temperature. In some embodiments, one degree-day 430 may refer to one degree of departure of the daily mean temperature for a given day from a base temperature. For example, if the base temperature is sixty-five degrees Fahrenheit (° F.) and the mean temperature for a given day is eighty-five ° F., then the given day may have twenty degree-days 430 (i.e., eighty-five degrees minus sixty-five degrees). In other embodiments, the number of degree-days 430 in a given day may be determined by monitoring the current temperature and continuously integrating the difference between the current temperature and the base temperature.

The base temperature used to calculate degree-days 430 may be any suitable temperature. In some embodiments, base temperature may be an outside temperature at which an average building does not require heating or cooling to maintain the indoor temperature at a configurable comfort level. According to certain embodiments, the base temperature may be from fifty-five to seventy ° F. In some embodiments, the base temperature may be sixty-five ° F.

In some embodiments, degree-day 430 may be referred to as a cooling degree-day 430 (CDD) or a heating degree-day 430 (HDD). One cooling degree-day 430 may refer to one degree of departure of the daily mean temperature for a given day above a base temperature. One heating degree-day 430 may refer to one degree of departure of the daily mean temperature for a given day below the base temperature. For example, if base temperature is sixty-five ° F. and the mean temperature for a given day is thirty-five ° F., then the given day has thirty heating degree-days 430. In contrast, if base temperature is sixty-five ° F. and the mean temperature for a given day is ninety ° F., then the given day has twenty-five cooling degree-days 430.

Platform 40 may determine the number of degree-days 430 for each day of a given year. In some embodiments, platform 40 may then determine the total number of degree-days 430 during one or more periods of time (e.g., week, month, year, etc.). In the illustrated example, each time period comprises thirty days (i.e., each time period roughly corresponds to a respective month). In the example, based at least in part on weather data 42, platform 40 determines that there were fortytwo cooling degree-days 430 during February 2004, two hundred fifty-four cooling degree-days 430 during March 2004, and so forth.

To normalize usage data, platform 40 may determine a normalization formula 432 that correlates utility usage 26 and outdoor temperature for a given site 24. In some embodiments, normalization formula 432 may be used to determine the expected utility usage 26 at site 24 as a linear or non-linear function of degree-days 430 at site 24. To determine normalization formula 432, platform 40 may perform a regression based at least in part on historical weather data 42. In the illustrated example, platform 40 performs a linear regression of usage data and weather data 42 over a four-year period (January 2004 to December 2007) to determine normalization formula 432. The regression may be performed according to any suitable method such as, for example, a least-squares method, an errors-in-variables method, a weighted least-squares method, and/or a robust regression method. In this example, platform 40 determines that utility usage 26 at site 24 during a given time period (i.e., thirty days in this example) may be approximated according to the following normalization formula 432:

$$U = 58.391 * T + 164,199$$

In the above formula, "U" represents the expected utility usage 26 during a given month and "T" represents the number of degree-days 430 during the given month.

Based at least in part on normalization formula 432, platform 40 may determine a balance point 434 of site 24. Balance point 434 of site 24 refers to the expected utility usage 26 of site 24 during a given month if there were no degree-days 430 during the month. Referring to the above example, if there were no degree-days 430 during the month (i.e., T=0), then the expected utility usage 26 during the month would be 164,199 kWh. Thus, in the above example, balance point 434 of site 24 is 164,199 kWh. In some embodiments, site 24 may comprise one or more customer systems 28 that are operated for purposes other than heating and/or cooling (e.g., assembly line at automobile factory, switch equipment at telephone facility, etc.). These customer systems 28 at may consume utility resources 14 even when there are no degree-days 430. Accordingly, such sites 24 may have balance points 434 that are greater than balance point 434 for site 24 with few or no customer systems 28 operated for purposes other than heating and/or cooling (e.g., warehouse, residence, etc.).

Platform 40 may determine normalized usage 428 of site 24 base at least in part on the expected utility usage 26 during one or more time periods, the actual utility usage 26 during one or more time periods, and/or the determined balance point 434. Platform 40 may determine the expected utility usage 26 for a particular period based at least in part on the determined degree-days 430 for that time period and/or the determined normalization formula 432. In some embodiments, for a given time period, platform 40 may input the determined degree-days 430 into normalization formula 432 to calculate the expected utility usage 26 for that time period. Referring to the illustrated example, platform 40 may determine the expected utility usage 26 during November 2007. In this example, platform 40 determines that there were 290 cooling degree-days 430 in November 2007. Platform 40 inputs this value into the determined normalization formula 432 (in this example, U=58.391*T+164,199) to determine that the expected utility usage 26 for November 2007 is 181,133 kWh. Thus, platform 40 may determine the expected utility usage 26 for each month based at least in part on the number of degree-days 430 during each month and the determined normalization formula 432.

In some embodiments, platform 40 then determines normalized usage 428 for a given time period. In some embodiments, platform 40 determines normalized usage 428 for a given time period based at least in part on the expected utility usage 26 during the time period, the actual utility usage 26 during the time period, and/or the determined balance point 434 of site 24. According to certain embodiments, platform 40 may determine the difference between the expected utility usage 26 for a particular time period and the actual utility usage 26 for the particular time period. Platform 40 may then determine normalized usage 428 by adding or subtracting the determined difference to/from the determined balance point 434 of site 24.

Referring to the previous example, platform 40 is operable to determine normalized usage 428 for November 2007. As explained above, platform 40 may determine that the expected utility usage 26 during November 2007 is 181,133 kWh. Platform 40 may then determine from invoice data 64 that the actual utility usage 26 in November 2007 was 183,842 kWh. Platform 40 may subtract the expected utility usage 26 from the actual utility usage 26 to determine a difference of 2,709 kWh. Platform 40 may then determine normalized usage 428 by adding the determined difference to balance point 434. In this example, platform 40 determines that normalized usage 428 during November 2007 is 166,909 kWh (i.e., 2,709 kWh+164,199 kWh). Thus, 166,909 kWh represents normalized usage 428 of site 24 during November 2007 (e.g., usage if weather were not a contributing factor).

In the foregoing example, platform 40 determines normalized usage 428 of site 24 based at least in part on monthly data (e.g., monthly weather data 42 and monthly usage information). It should be understood, however, that platform 40 may determine normalized usage 428 of site 24 based at least in part on weekly data, bi-weekly data, and/or data for any suitable length of time.

In the foregoing example, platform 40 determines normalized usage 428 of site 24 based at least in part on cooling degree-days 430. It should be understood, however, that platform 40 may determine normalized usage 428 of site 24 based at least in part on heating degree-days 430, cooling degree-days 430, all degree-days 430, and/or any suitable metric for temperature.

In the foregoing example, platform 40 determines normalized usage 428 of electricity at site 24. It should be understood, however, that platform 40 may determine normalized usage 428 of natural gas, water, coal, oil, and/or any suitable utility resource 14.

In the foregoing example, platform 40 determines normalized usage 428 of site 24 based at least in part on a linear regression of historical utility usage 26. It should be understood, however, that platform 40 may determine normalized usage 428 of site 24 based at least in part on a non-linear regression and/or any suitable technique.

Figure 12:
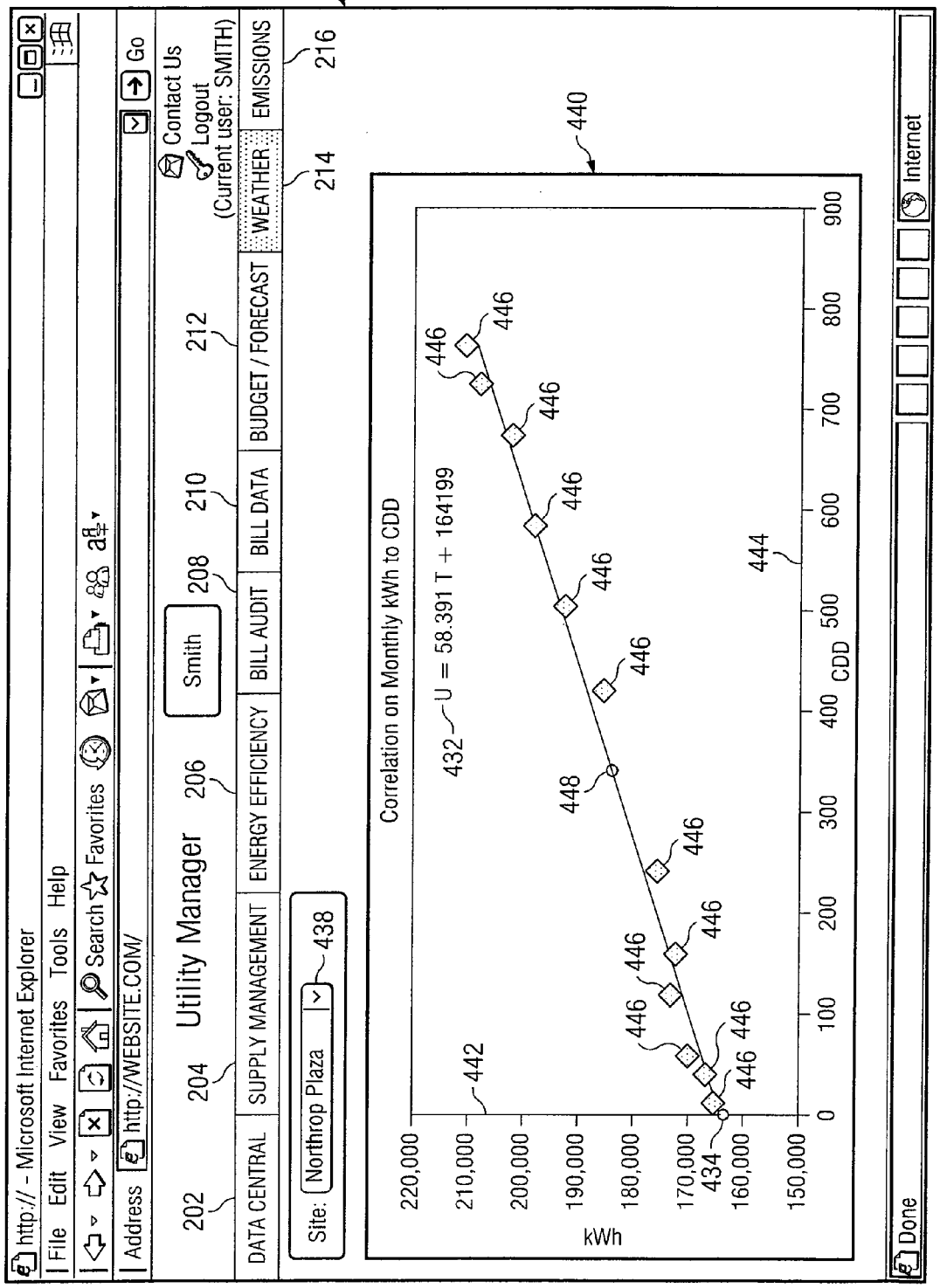
FIG. 12 illustrates an example GUI that illustrates the correlation of degree-days with expected utility usage at a customer site, according to certain embodiments.

FIG. 12 illustrates an example GUI 72 that illustrates the correlation of degree-days 430 with expected utility usage 26 at site 24, according to certain embodiments. GUI 72 may comprise site field 438 and usage graph 440. Site field 438 may permit user 68 to select a particular site 24 for which user 68 wishes to normalize utility usage 26.

Usage graph 440 may display a relationship between historical utility usage 26 and outdoor temperature at the selected site 24. As explained above, platform 40 may determine normalization formula 432 representing a relationship between degree-days 430 and utility usage 26 based at least in part on historical usage data and historical weather data 42 associated with site 24. Platform 40 may use historical usage data and weather data 42 for any suitable period of time. In some embodiments, platform 40 may use historical usage data and weather data 42 for a period longer than or equal to two years. According to certain embodiments, platform 40 may use historical usage and weather data 42 for a period longer than or equal to four years. In the illustrated example, platform 40 uses historical usage and weather data 42 from January 2004 to December 2007 to determine normalization formula 432. For each month during this four-year period, platform 40 determines the average utility usage 26 and the average number of degree-days 430 at site 24. Referring to the example illustrated in FIG. 11, utility usage 26 during the average February from 2004 to 2007 was approximately 169,828 kWh and the number of cooling degree-days 430 during the average February from 2004 to 2007 was fifty-eight. In this example, platform 40 may determine the four-year average utility usage 26 and number of degree-days 430 for each month.

The example usage graph 440 illustrated in FIG. 12 may comprise the determined average utility usage 26 and number of degree-days 430. In some embodiments, usage graph 440 comprises a first axis 442 representing usage of utility resource 14 at site 24 and a second axis 444 representing numbers of degree-days 430 at site 24. For each period (e.g., month) of the year, usage graph 440 may display the long-term (e.g., two-year, four-year, etc.) average for utility usage 26 and number of degree days for each period (illustrated as points 446). In the illustrated example, each point 446 represents the four-year average for utility usage 26 and number of degree days for each month. For example, the first point 446 illustrates utility usage 26 and number of degree days for the average January from 2004 to 2007, the second point 446 illustrates utility usage 26 and number of degree days for the average February from 2004 to 2007, and so forth.

In some embodiments, graph may further comprise a line 448 that represents the relationship between utility usage 26 and number of degree days at site 24. Line 448 may be expressed as normalization formula 432. As explained above, normalization formula 432 may be determined by performing a linear or non-linear regression of historical utility usage 26 and/or weather data 42 for the selected period (e.g., from January 2004 to December 2007).

In some embodiments, usage graph 440 may comprise balance point 434. Balance point 434 may refer to the expected utility usage 26 at site 24 during a period with no degree-days 430. In this example, balance point 434 is illustrated graphically as the y-intercept of line 448 with axis 442 (i.e., 164,199 kWh). As explained above, platform 40 may use the determined formula and balance point 434 to determine normalized usage 428 at site 24.

Figure 13:
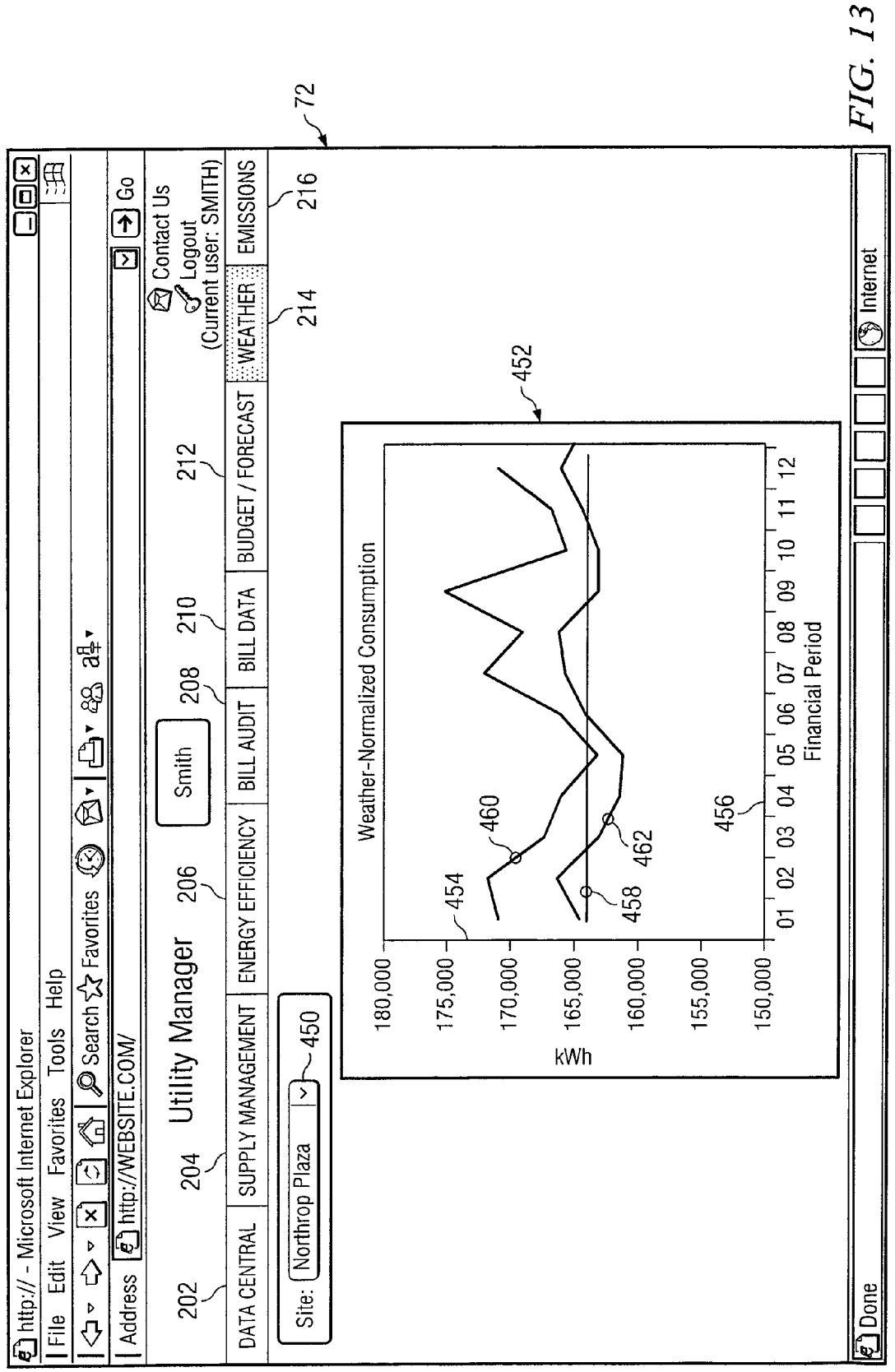
FIG. 13 illustrates an example GUI that displays normalized usage data, according to certain embodiments.

FIG. 13 illustrates an example GUI 72 that displays normalized usage data, according to certain embodiments. GUI 72 may comprise site field 438 and usage graph 452. Site field 438 may permit user 68 to select a particular site 24 for which user 68 wishes to normalize utility usage 26.

Usage graph 452 may display normalized usage 428 of site 24 for a configurable period of time. Usage graph 452 may comprise a first axis 454 representing normalized usage 428 and a second axis 456 representing one or more periods of time. Usage graph 452 may comprise a first line 458 that indicates the determined balance point 434 of site 24. Graph may comprise a second line 460 that indicates normalized usage 428 at site 24. In the illustrated example, line 460 illustrates normalized usage 428 at site 24 from January 2007 to December 2007. According to certain embodiments, graph may comprise a third line 462 that indicates a long-term average of normalized usage 428 for site 24. In the illustrated example, line 462 represents normalized usage 428 at site 24 based on four-year averages for each month from January 2004 to December 2007.

The graphical presentation of normalized usage 428 may permit user 68 to easily identify problems unrelated to weather that may contribute to changes in usage at site 24. In the illustrated example, user 68 may easily observe that normalized usage 428 for September 2007 in line 460 sharply deviated from both the balance point 434 (i.e., line 458) and the four-year average of normalized usage 428 (i.e., line 462). This observation may alert user 68 to a problem, unrelated to weather, that occurred during September 2007 and that caused an increase in utility usage 26 at site 24. User 68 may then use client 70 to retrieve supply data 62, site data 36, invoice data 64, and/or audit data 66 associated with September 2007 to determine the problem. Without the display of normalized usage 428, user 68 may not as easily detect that the increased utility usage 26 during September 2007 was due to a problem other than weather.

FIG. 14 illustrates an example GUI 72 that displays emission data 56 associated with one or more sites 24, according to certain embodiments. In some embodiments, platform 40 may determine an amount of emissions that are directly and/or indirectly caused by utility usage 26 at site 24. In some embodiments, platform 40 may determine emissions for any suitable pollutant such as, for example, carbon dioxide ($CO_2$), sulfur dioxide ($SO_2$), carbon monoxide (CO), methane, volatile organic compounds, nitric oxide (NO), nitrous oxide ($N_2O$), nitric dioxide ($NO_2$), and/or any suitable pollutants. Platform 40 may determine the amount of emissions attributable to site 24 based at least in part on utility usage 26 at site 24 and at least one emission factor 58. Emission factor 58 may refer to the average emission rate of a given pollutant for a given activity. The activity may be any suitable activity that contributes directly or indirectly to the release of pollutants into the atmosphere. In some embodiments, the activity may be consumption of electricity, usage of steam, usage of chilled water, and/or combustion of gas, oil, diesel, coal, propane, and/or wood. Platform 40 may determine the emission of pollutant based at least in part on the intensity of the particular activity and/or at least one emission factor 58.

In some embodiments, GUI 72 comprises a search field 464 and an emission table 466. Search field 464 may permit user 68 to select at least one type of pollutant for which user 68 wishes to retrieve emission factors 58.

Emission table 466 may display emission factors 58 for the selected pollutant. Each emission factor 58 in emission table 466 may be associated with a respective activity. In the illustrated embodiment, emission table 466 displays emission factors 58 for various activities. For example, emission table 466 display emission factors 58 for usage of electricity (illustrated as column 468); emission factors 58 for combustion of natural gas, oil, diesel, coal, wood, and propane (illustrated as columns 470-480); and emission factors 58 for the consumption of steam and chilled water (illustrated as columns 482-484).

In some embodiments, each emission factor 58 in emission table 466 may be associated with a respective location (illustrated as column 486). In the illustrated example, each emission factor 58 is associated with a respective state. According to certain embodiments, emission factor 58 for a particular activity in one location may be different from emission factor 58 for the same activity in a different location. For example, the $CO_2$ emission factor 58 for usage of electricity in Connecticut may be 754.1860 lbs/MWh while the $CO_2$ emission factor 58 for usage of electricity in Indiana may be 2098.0280 lbs/MWh. In some embodiments, this difference may be due to different locations having different sources of electricity. For example, a higher percentage of Connecticut's electricity may be generated from clean sources (e.g., nuclear, wind, and/or geothermal energy) and/or a higher percentage of Indiana's electricity may be generated from more polluting sources (e.g., coal, oil, and/or gas).

Although the illustrated example shows emission factors 58 for $CO_2$, it should be understood that GUI 72 may display emission factors 58 for any suitable type and/or combination of pollutants.

Figure 15:
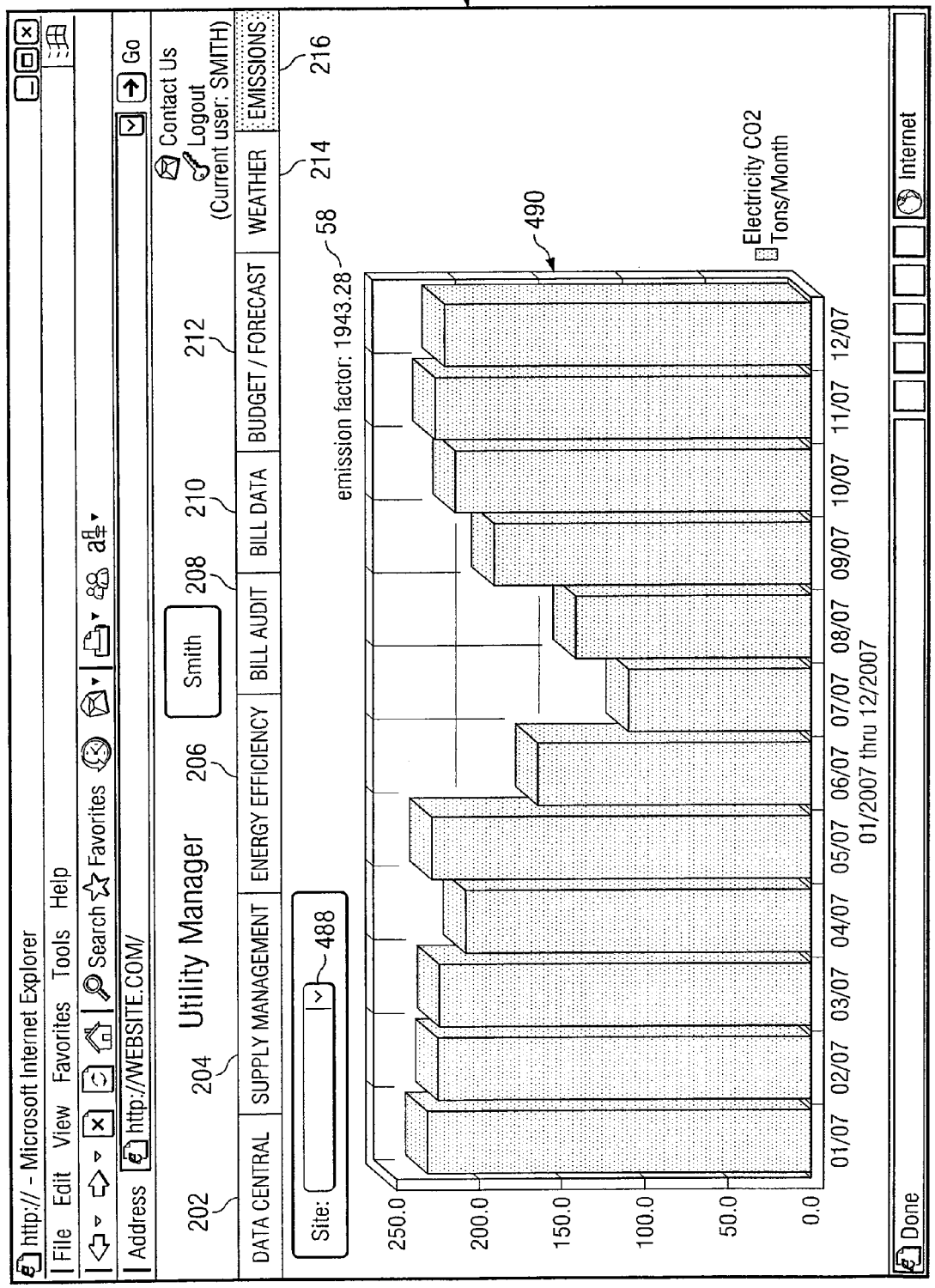

FIG. 15 illustrates an example GUI 72 that displays emissions that are directly and/or indirectly caused by utility usage 26 at site 24. GUI 72 may comprise site field 488 and emission graph 490. Site field 488 may permit user 68 to select a particular site 24 for displaying emission data 56.

Emission graph 490 may graphically illustrate emissions that are directly or indirectly caused by utility usage 26 at site 24. As explained above, platform 40 may determine the emission of pollutants attributable to site 24 based at least in part on a particular activity at site 24 and/or at least one emission factor 58. In some embodiments, platform 40 determines the emission of pollutants according to the following formula:

$$P=A*F$$

In the above formula, "P" may represent the amount of pollutant that is emitted into the atmosphere. "P" may be expressed according to any suitable metric such as, for example, weight, mass, and/or volume. "A" may represent the particular activity that causes the emission of pollutants. As explained above, the activity may comprise consuming resources such as, for example, energy and water. "A" may be expressed according to any suitable metric such as, for example, energy or work. "F" may represent the appropriate emission factor 58 based on the particular activity and the location of activity.

An example illustrates certain embodiments. GUI 72 may display to user 68 that site 24 in California used fifty MWh of electricity during a particular period. User 68 may request platform 40 to determine the amount of $CO_2$ emissions that are attributable to the usage of electricity at site 24 during the particular period. In response to the request from user 68, platform 40 may determine the appropriate $CO_2$ emission factor 58 for the usage of electricity in California. In this example, platform 40 determines, based at least in part on emission table, that the appropriate $CO_2$ emission factor 58 is 700.4000 lbs/MWh. In this example, platform 40 determines the amount of $CO_2$ emissions attributable to site 24 by multiplying utility usage 26 at site 24 by the appropriate emission factor 58. Accordingly, platform 40 determines that the amount of $CO_2$ emissions attributable to site 24 during the particular period is approximately 35,020 lbs of $CO_2$.

Although platform 40 determines $CO_2$ emissions for site 24 in the foregoing example, it should be understood that platform 40 may determine emissions of any type and/or combination of pollutants.

Figure 16:
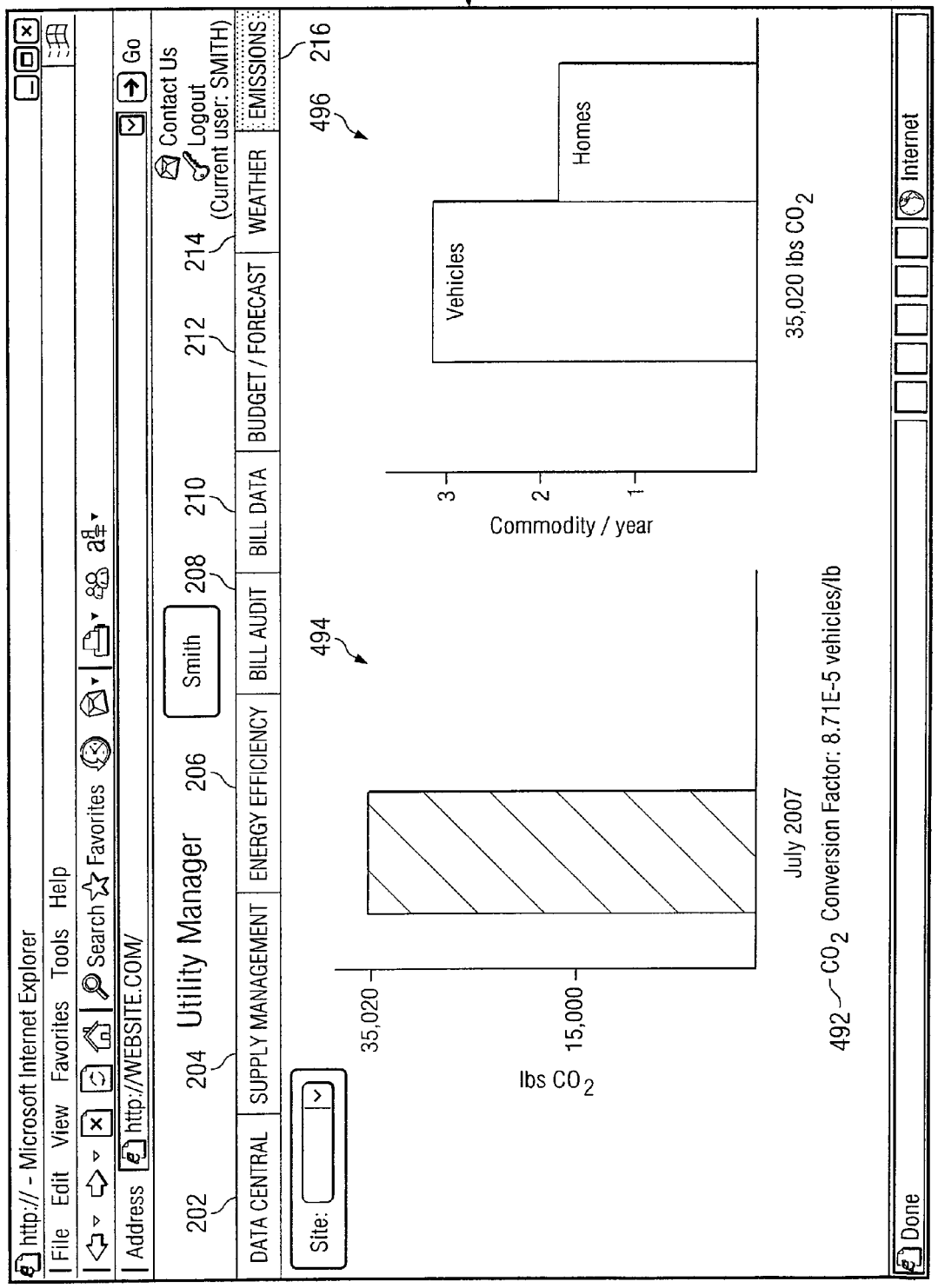

FIG. 16 illustrates an example GUI 72 that displays information regarding emissions attributable to site 24. In some embodiments, platform 40 may convert emissions attributable to site 24 to emissions produced or consumed by a commodity.

The commodity may be any suitable object, item, and/or entity that consumes and/or produces (directly and/or indirectly) pollutants. In some embodiments, the commodity may be vehicles and/or homes that produce emissions (either directly or indirectly). In other embodiments, the commodity may be trees and/or plants that consume pollutants such as, for example, $CO_2$. Platform 40 may convert an amount of pollutants attributable to site 24 to an amount of any suitable commodity. For example, platform 40 may convert a particular amount of $CO_2$ emissions to a number of forest acres that, on average, consume the particular amount of $CO_2$ emissions during a given period. As another example, platform 40 may convert a particular amount of $CO_2$ emissions to a number of vehicles that, on average, emit the particular amount of $CO_2$ emissions during a given period. Although the foregoing examples describe trees and vehicles as commodities, platform 40 may convert emissions of pollutants to any type and/or combination of commodities.

In some embodiments, platform 40 may store in manager memory 48 one or more conversion factors 492. Platform 40 may convert emissions attributable to site 24 to emissions produced or consumed by a particular commodity based at least in part on conversion factor 492. In some embodiments, platform 40 may multiply a particular amount of emissions attributable to site 24 by conversion factor 492 to determine an amount of a particular commodity that consumes or produces the particular amount of emissions. Platform 40 may store any suitably type and/or combination of conversion factors 492. In some embodiments, platform 40 may store conversion factors 492 for emissions comprising carbon dioxide ($CO_2$), sulfur dioxide ($SO_2$), carbon monoxide (CO), methane, volatile organic compounds, nitric oxide (NO), nitrous oxide ($N_2O$), nitric dioxide ($NO_2$), and/or any suitable pollutants. In the illustrated example, GUI 72 displays conversion factor 492 of 8.71E-5 for converting a particular amount of $CO_2$ (expressed in lbs) to the number of average vehicles that collectively emit the particular amount of $CO_2$ each year. Although the example GUI 72 displays a particular conversion factor 492 for vehicles, GUI 72 may be operable to display any suitable conversions factors for any type and/or combination of commodities.

In some embodiments, platform 40 may convert a reduction or increase in emissions for site 24 to an amount of at least one commodity. For example, if customer 30 reduces usage of electricity at site 24, platform 40 may determine a reduction in $CO_2$ emissions attributable to site 24 and convert the determined reduction to at least one commodity. As an example, customer 30 reduces emissions at site 24 during a particular year by fifty MWh in comparison to the previous year. Using emission factor 58 and the location of site 24, platform 40 determines that the reduction in electricity usage resulted in a reduction in emissions of 35,020 lbs of $CO_2$, as illustrated in the example emission graph 494. Based at least in part on this reduction in emissions, platform 40 may determine a number of average vehicles that emit an equivalent quantity of $CO_2$ during a given year. In this example, platform 40 determines that conversion factor 492 for converting lbs $CO_2$ per period to number of average vehicles per year is 8.71E-5. In this example, platform 40 multiplies 35,020 lbs by 8.71E-5 to determine that the reduction in electricity usage at site 24 during the particular year is approximately equal to $CO_2$ emissions of approximately three average vehicles during a year, as illustrated in commodity graph 496. Thus, customer 30 may report to investors and/or other interested individuals that its reduction of electricity usage at site 24 during the year was equivalent to removing three average vehicles from the road during a year.

Although the foregoing example describes converting emissions to an equivalent number of vehicles, platform 40 may be operable to convert emissions to an equivalent number of acres of trees saved by the reduction in emissions, to an equivalent number of single-family homes, and/or to an equivalent amount of any suitable commodity.

In some embodiments, platform 40 may determine an increase or reduction in emissions attributable to site 24 based at least in part on normalized usage 428 at site 24. For example, platform 40 may determine the difference between balance point 434 for site 24 and normalized usage 428 at site 24 during a particular time period. Based at least in part on emission factor 58, platform 40 may determine a particular amount of emissions that corresponds to the determined difference between balanced point and normalized usage 428 at site 24. In some embodiments, platform 40 may convert the particular amount of emissions to a particular commodity (e.g., forest acres, vehicles, etc.) that produce and/or consume pollutants.

An example illustrates certain embodiments. In the illustrated example, platform 40 determines that balance point 434 for Green Tower is 150,025 kWh. Platform 40 further determines that normalized usage 428 for Green Tower during January 2007 was 120,025 kWh. Accordingly, due to factors other than weather, Green Tower consumed 30,000 kWh fewer than expected during January 2007.

In this example, platform 40 determines that the appropriate $CO_2$ emission factor 58 for the selected site 24 is 0.7004 lbs/kWh. Accordingly, platform 40 multiplies emission factor 58 by 30,000 kWh to determine that the reduction in normalized usage 428 during January 2007 caused a reduction in emissions of 21,012 lbs $CO_2$. Platform 40 then multiplies the determined reduction in emissions by the appropriate conversion factor 492 to determine that the reduction in normalized usage 428 at site 24 during January 2007 was equivalent to removing two average vehicles from the road during a year.

Thus, GUI 72 may allow user 68 to observe the effect on emissions caused by an increase or decrease in utility usage 26 at site 24. Knowing the environmental effect of utility usage 26 at site 24 may be valuable to interested parties such as, for example, investors, regulators, lawmakers, and/or other individuals and entities. In some embodiments, expressing changes in emissions associated with changes in normalized usage 428 at site 24 may demonstrate how the activities of customer 30, rather than the weather, are affecting emissions.

Figure 17:
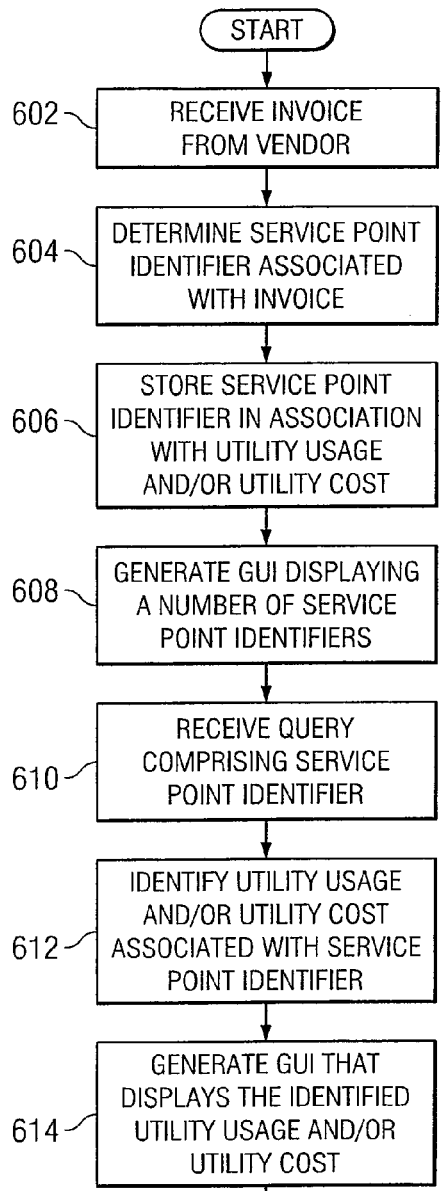
FIG. 17 illustrates a flowchart for searching invoice data that is indexed according to service point identifier, according to certain embodiments.

FIG. 17 illustrates a flowchart for retrieving invoice data 64 that is indexed according to service point identifier 84, according to certain embodiments. The method begins at step 602 where manager processor 52 receives invoice from vendor 20. Invoice 16 may comprise any suitable information such as, for example, utility usage 26 and utility cost 12 for a given billing period. At step 604, manager processor 52 determines service point identifier 84 associated with invoice 16. Service point identifier 84 may uniquely identify the particular service point to which vendor 20 delivered utility resource 14 associated with invoice 16. At step 606, manager processor 52 stores in memory module 46 service point identifier 84 in association with utility usage 26 and/or utility cost 12 from invoice 16. In some embodiments, manager processor 52 may further store in memory module 46 at least one account identifier 86, site name, street address, and/or meter identifier 82 associated with service point identifier 84. Manager processor 52 may repeat steps 604 to 606 for each invoice 16 received from each vendor 20 in system 10.

At step 608, manager processor 52 generates GUI 72 that displays a plurality of service point identifiers 84. In some embodiments, client 70 displays GUI 72 to user 68. User 68 may submit a query by at least selecting one or more of the displayed service point identifiers 84. At step 610, manager processor 52 may receive from client 70 a query comprising at least one service point identifier 84. At step 612, manager processor 52 may identify in memory module 46 one or more values for utility usage 26 and/or utility cost 12 associated with service point identifier 84 from the query. At step 614, manager processor 52 may generate GUI 72 that displays the identified utility usage 26 and/or utility cost 12. Client 70 may display GUI 72 to user 68. The method then ends.

Figure 18:
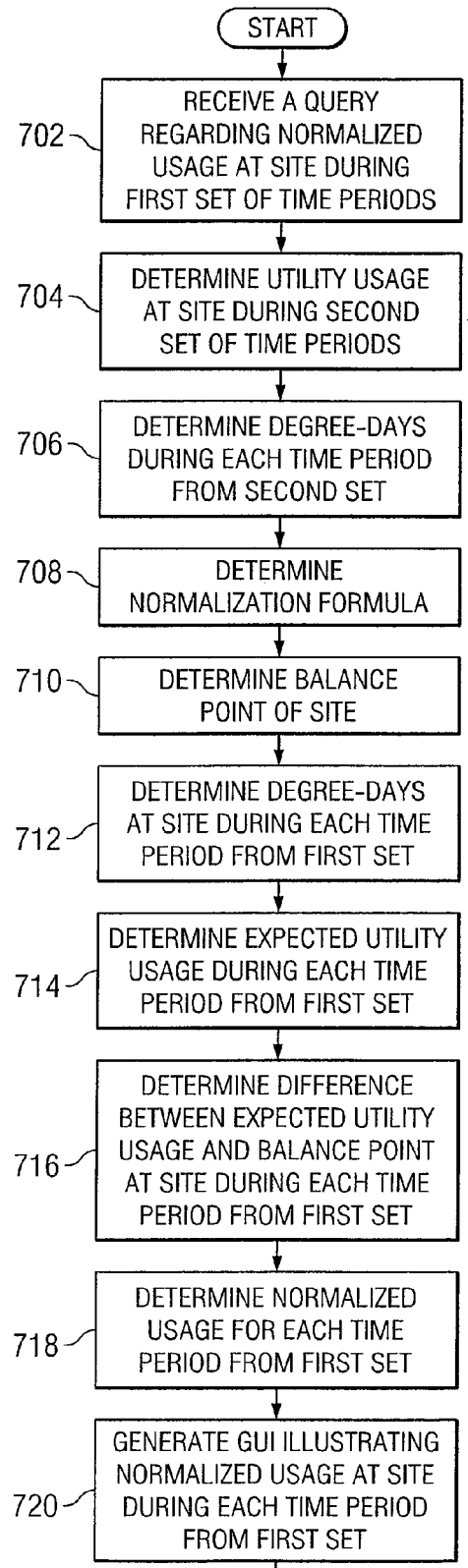
FIG. 18 illustrates a flowchart for determining normalized usage of a utility resource at a customer site, according to certain embodiments.

FIG. 18 illustrates a flowchart for determining normalized usage 428 of utility resource 14 at site 24, according to certain embodiments. The method begins at step 702 where manager processor 52 receives a query for normalized usage 428 at site 24 during a first set of time periods. At step 704, manager processor 52 determines utility usage 26 at site 24 during each time period from a second set of time periods. In some embodiments, the first set of time periods and the second set of time periods may be the same or may overlap. For example, the first set of time periods may comprise each month from January 2007 to December 2007 and the second set of time periods may comprise each month from January 2004 to December 2007. In other embodiments, the first set of time periods may not overlap with the second set of time periods.

At step 706, manager processor 52 may determine the number of degree-days 430 at site 24 during each time period from the second set of time periods. Manager processor 52 may determine the number of degree-days 430 based at least in part on weather data 42 from weather center 60. At step 708, manager processor 52 determines normalization formula 432 that expresses an expected utility usage 26 at site 24 during a particular time period as a function of the number of degree-days 430 at site 24 during the particular time period. Normalization formula 432 may be determined based at least in part on a linear or non-linear regression of the determined utility usage 26 and/or determined number of degree-days 430 at site 24 during each time period from the second plurality of time periods.

At step 710, manager processor 52 may determine balance point 434 of site 24 based at least in part on normalization formula 432. Balance point 434 may represent the expected utility usage 26 of site 24 during a particular time period if there were no degree-days 430 during the particular time period. At step 712, manager processor 52 may determine the number of degree-days 430 at site 24 during each time period from the first set of time periods. Manager processor 52 may determine the number of degree-days 430 based at least in part on weather data 42 from weather center 60. At step 714, manager processor 52 may determine the expected utility usage 26 at site 24 during each time period from the first set of time periods. The expected utility usage 26 at site 24 during a particular time period may be based at least in part on normalization formula 432 and the number of degree-days 430 at site 24 during the particular time period.

At step 716, manager processor 52 may determine the difference between the expected utility usage 26 and balance point 434 at site 24 during each time period from the first set of time periods. At step 718, manager processor 52 may determine normalized usage 428 for each time period from the first set of time periods by adding balance point 434 to the determined difference for each time period from the first set of time periods. At step 720, manager processor 52 may generate GUI 72 that comprises graph illustrating normalized usage 428 at site 24 during each time period from the first set of time periods. Deviations of normalized usage 428 from balance point 434 of site 24 may indicate that factors other than weather are causing increases or decreases of utility usage 26 at site 24. The method then ends.

Figure 19:
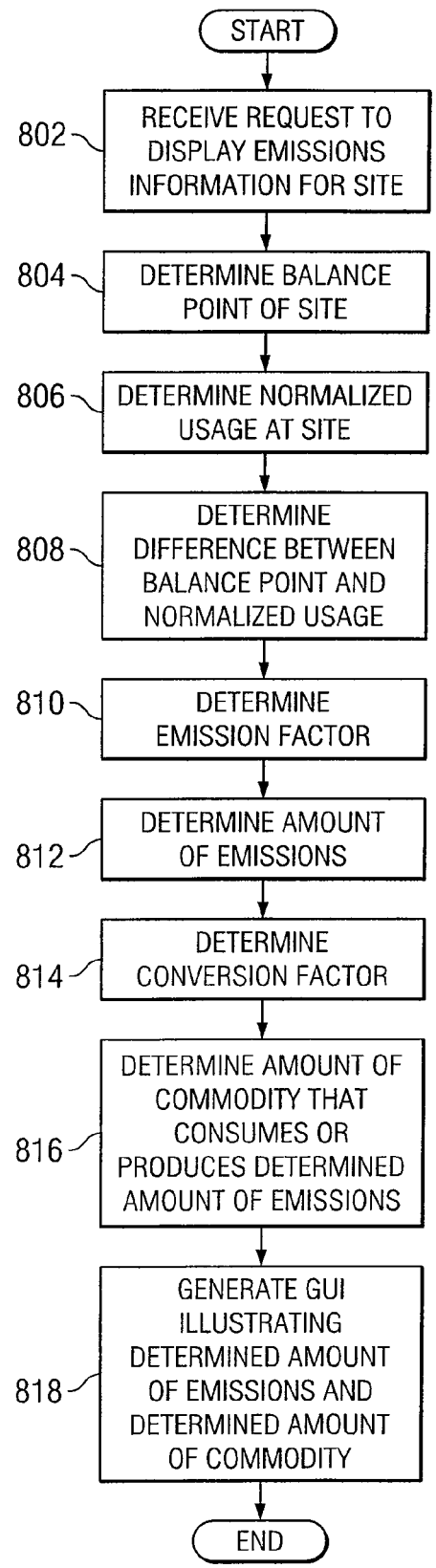
FIG. 19 illustrates a flowchart for generating a GUI that displays information regarding emissions associated with a customer site, according to certain embodiments.

FIG. 19 illustrates a flowchart for generating GUI 72 that displays information regarding emissions of a particular pollutant caused directly or indirectly by changes in normalized usage 428 at site 24. The method begins at step 802 where manager processor 52 receives from client 70 a request to display emission data 56 based on changes in normalized usage 428 at site 24 during a particular time period. At step 804, manager processor 52 determines balance point 434 of site 24. At step 806, manager processor 52 determines normalized usage 428 at site 24 during the particular time period. Manager processor 52 may determine balance point 434 and/or normalized usage 428 according to the method described above with respect to FIG. 18.

At step 808, manager processor 52 determines the difference between balance point 434 of site 24 and the determined normalized usage 428 at site 24 during the particular time period. At step 810, manager processor 52 determines the appropriate emission factor 58 associated with the particular pollutant and the selected site 24. Manager processor 52 may determine emission factor 58 based at least in part on emission data 56 stored in manager memory 48. At step 812, platform 40 determines an amount of emissions based at least in part on the determined emission factor 58 and the determined difference between balance point 434 of site 24 and the determined normalized usage 428 at site 24 during the particular time period.

At step 814, manager processor 52 determines an appropriate conversion factor 492 for converting the determined amount of emissions to an amount of a commodity that consumes or produces emissions. The commodity may be any suitable commodity such as, for example, forest acres, vehicles, and single-family homes. Manager processor 52 may determine the appropriate conversion factor 492 based at least in part on emission data 56 stored in manager memory 48. At step 816, based at least in part on the determined conversion factor 492 and the determined amount of emissions, manager processor 52 may determine an amount of the commodity that consumes or produces the determined amount of emissions during a particular time period. At step 818, manager processor 52 may generate GUI 72 that graphically illustrates the increase or decrease in emissions caused directly or indirectly by a change in normalized usage 428 at site 24. In some embodiments, GUI 72 may graphically illustrate the determined amount of the commodity. Client 70 may display GUI 72 to user 68. The method then ends.

Although the present invention has been described in detail, it should be understood the various changes, substitutions, and alterations can be made hereto without departing from the scope of the invention as defined by the appended claims.

What is claimed is:

1. A system, comprising:
one or more computer memory modules that store:
utility invoice data received from a utility vendor, the utility invoice data including:
a plurality of usage values, each usage value based at least in part on usage of at least one utility resource, the usage measured by at least one utility meter having at least one meter identifier;
a plurality of cost values, each cost value at least in part based on a corresponding usage value;
a plurality of account identifiers, each account identifier associated with at least one utility account and stored in association with at least one of the plurality of usage values and at least one of the plurality of cost values; and
a plurality of service point identifiers, the plurality of service point identifiers including a first service point identifier representing a physical location of a first utility meter having a first meter identifier, the first service point identifier stored in association with a first usage value measured by the first utility meter, a first cost value for the first usage value, and a particular account identifier, wherein the first service point identifier retains its association with the physical location, the first usage value, the first cost value, and the particular account identifier in response to a replacement of the first utility meter with a second utility meter having a second meter identifier and a change of the particular account identifier to a new account identifier; and
a processor that is communicatively coupled to the one or more computer memory modules and that:
receives a request for historical information associated with the physical location, the request comprising the first service point identifier;
retrieves the historical information from the one or more computer memory modules in response to the request, the historical information retrieved based at least in part on the first service point identifier in the request, wherein the historical information includes historical usage values and historical cost values associated with the physical location, the first meter identifier, the second meter identifier, the particular account identifier, and the new account identifier;
generates a graphical user interface that displays the historical information;
determines a plurality of strategies for reducing utility costs for future utility usage at the physical location based at least in part on the historical usage values and the historical cost values associated with the physical location, the first meter identifier, the second meter identifier, the particular account identifier, and the new account identifier;
determines a plurality of monetary savings values, each associated with one of the plurality of strategies for reducing utility costs for future utility usage at the physical location; and
presents the plurality of strategies and their associated plurality of monetary savings values using the graphical user interface.

2. The system of claim 1, the at least one utility resource comprising at least one of:
water;
natural gas;
coal;
oil; and
electricity.

3. The system of claim 1, wherein:
a second usage value is stored in association with the first service point identifier;
a third usage value is stored in association with a second service point identifier; and
in response to a request for historical information associated with the first service point identifier, the request comprising the first service point identifier, the processor retrieves the first and second usage values without retrieving the third usage value; and
in response to a request for historical information associated with the second service point identifier, the request comprising the second service point identifier, the processor retrieves the third usage value without retrieving the first and second usage values.

4. The system of claim 1, wherein:
the physical location represented by the first service point identifier is located at a customer site and the one or more computer memory modules store at least one street address of the customer site;

the customer site comprises a third meter having a third meter identifier; and the plurality of service point identifiers include a third service point identifier representing a physical location at the customer site of the third utility meter.

5. The system of claim 1, wherein each usage value represents a cost charged by a vendor for the usage of the at least one utility resource.

6. The system of claim 1, wherein:

each usage value represents an amount of the at least one resource that is delivered to a customer site; and each of the plurality of service point identifiers represents a point of delivery of the at least one utility resource from a vendor to the customer site.

7. The system of claim 1, wherein the processor normalizes at least a portion of the retrieved historical information based at least in part on weather data.

8. The system of claim 1, wherein the processor determines at least one emissions value based at least in part on the retrieved historical information, the at least one emissions value representing emissions of at least one pollutant associated the usage of at least one utility resource at the physical location.

9. The system of claim 1, wherein:

retrieving historical information comprises:

retrieving the first usage value measured by the first utility meter, the first usage value representing an amount of actual usage of a utility resource at the physical location; and retrieving a budgeted usage value representing an amount budgeted by a customer for usage of the utility resource at the physical location; and the graphical user interface displays the amount of actual usage in association with the budgeted amount for usage.

10. The system of claim 1, the plurality of strategies comprising:

negotiating a contract term for a utility service;

selecting a vendor for the utility service;

fixing equipment located at the physical location;

correcting a billing error for the utility service; and changing an operating parameter at the physical location.

11. A method, comprising:

receiving utility invoice data from a utility vendor, the utility invoice data including:

a plurality of usage values, each usage value based at least in part on usage of at least one utility resource, the usage measured by at least one utility meter having at least one meter identifier;

a plurality of cost values, each cost value based at least in part on a corresponding usage value;

a plurality of account identifiers, each account identifier associated with at least one utility account and stored in association with at least one of the plurality of usage values and at least one of the plurality of cost values;

storing the utility invoice data in one or more computer memory modules;

storing a plurality of service point identifiers in the one or more computer memory modules, the plurality of service point identifiers including a first service point identifier representing a physical location of a first utility meter having a first meter identifier, the particular service point identifier stored in association with a first usage value measured by the first utility meter, a first cost value for the first usage value, and a particular account identifier, wherein the first service point identifier retains its association with the physical location, the first usage value, the first cost value, and the particular account identifier in response to a replacement of the first utility meter with a second utility meter having a second meter identifier and a change of the particular account identifier to a new account identifier;

receiving a request for historical information associated with the physical location, the request comprising the particular service point identifier;

retrieving the historical information from the one or more computer memory modules using a processor in response to the request, the historical information retrieved based at least in part on the particular service point identifier in the request, wherein the historical information includes historical usage values and historical cost values associated with the physical location, the first meter identifier, the second meter identifier, the particular account identifier, and the new account identifier;

generating on a display a graphical user interface that displays the historical information, determining a plurality of strategies for reducing utility costs for future utility usage at the physical location based at least in part on the historical usage values and the historical cost values associated with the physical location, the first meter identifier, the second meter identifier, the particular account identifier, and the new account identifier;

determining a plurality of monetary savings values, each associated with one of the plurality of strategies for reducing utility costs for future utility usage at the physical location; and presenting the plurality of strategies and their associated plurality of monetary savings values using the graphical user interface.

12. The method of claim 11, wherein:

a second usage value is stored in association with the first service point identifier;

a third usage value is stored in association with a second service point identifier;

in response to a request for historical information associated with the first service point identifier, the request comprising the first service point identifier, the first and second usage values are retrieved without retrieving the third usage value; and in response to a request for historical information associated with the second service point identifier, the request comprising the second service point identifier, the third usage value is retrieved without retrieving the first and second usage values.

13. The method of claim 11, wherein:

the physical location represented by the first service point identifier is located at a customer site, the one or more computer memory modules storing at least one street address of the customer site;

the customer site additionally comprises a third meter having a third meter identifier; and the plurality of service point identifiers include a third service point identifier representing a physical location at the customer site of the third utility meter.

14. The method of claim 11, wherein each usage value represents a cost charged by a vendor for the usage of the at least one utility resource.

15. The method of claim 11, wherein:

each usage value represents an amount of the at least one resource that is delivered to a customer site; and each of the plurality of service point identifiers represents a point of delivery of the at least one utility resource from a vendor to the customer site.

16. The method of claim 11, further comprising:
normalizing at least a portion of the retrieved historical information based at least in part on weather data.

17. The method of claim 11, further comprising:
determining at least one emissions value based at least in part on the the retrieved historical information, the at least one emissions value representing emissions of at least one pollutant associated usage of at least one utility resource at the physical location.

18. The method of claim 11, wherein:
retrieving the historical information comprises:
  retrieving the first usage value measured by the first utility meter, the first usage value representing an amount of actual usage of the a utility resource at the physical location; and
  retrieving a budgeted usage value representing an amount budgeted by a customer for usage of the utility resource at the physical location; and
the graphical user interface displays the amount of actual usage in association with the budgeted amount for usage.

19. The method of claim 11, the plurality of strategies comprising:
negotiating a contract term for a utility service;
selecting a vendor for the utility service;
fixing equipment located at the physical location;
correcting a billing error for the utility service; and
changing an operating parameter at the physical location.

20. A graphical user interface, comprising:
a plurality of service point identifiers, the plurality of service point identifiers including a first service point identifier representing a physical location of a first utility meter having a first meter identifier, the first service point identifier associated with a first usage value measured by the first utility meter, a first cost value for the first usage value, and a particular account identifier the first usage value, the first cost value, and the particular account identifier included in invoice data received from a utility vendor, wherein the first service point identifier retains its association with the physical location, the first usage value, the first cost value, and the particular account identifier in response to a replacement of the first utility meter with a second utility meter having a second meter identifier and a change of the particular account identifier to a new account identifier; and a chart that, in response to a selection of the first service point identifier, displays historical information associated with the physical location, the historical information based at least in part on the first service point identifier, wherein the historical information includes historical usage values and historical cost values associated with the physical location, the first meter identifier, the second meter identifier, the new account identifier, and the particular account identifier, wherein the historical usage values include:
  the first usage value, the first usage value representing an amount of usage for a utility resource delivered to a first service point associated with the first service point identifier, the first usage value associated with an invoice from an expired account associated with the particular account identifier, the first usage value measured at least in part by the first utility meter;
  a second usage value for the utility resource delivered to the first service point associated with the first service point identifier, the second usage value associated with an invoice from a new account associated with the new account identifier, the second usage value measured at least in part by the first utility meter; and
  a third usage value for the utility resource delivered to the first service point associated with the first service point identifier, the third usage value associated with the invoice from the new account associated with the new account identifier, the third usage value measured at least in part by the second utility meter;
wherein the chart also presents a plurality of strategies and a plurality of monetary savings values, the plurality of monetary savings values each associated with one of the plurality of strategies, the plurality of strategies each capable of reducing utility costs for future utility usage at the physical location and determined based at least in part on the historical usage values and the historical cost values associated with the physical location, the first meter identifier, the second meter identifier, the particular account identifier, and the new account identifier.

* * * * *